US010924619B2

(12) United States Patent
Ando et al.

(10) Patent No.: US 10,924,619 B2
(45) Date of Patent: Feb. 16, 2021

(54) IMAGE FORMING SYSTEM

(71) Applicant: CANON KABUSHIKI KAISHA, Tokyo (JP)

(72) Inventors: Yutaka Ando, Toride (JP); Toshiyuki Miyake, Nagareyama (JP); Takashi Yokoya, Yoshikawa (JP); Koji Yumoto, Toride (JP); Riki Fukuhara, Funabashi (JP); Akihiro Kawakita, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/823,499

(22) Filed: Mar. 19, 2020

(65) Prior Publication Data

US 2020/0314253 A1 Oct. 1, 2020

(30) Foreign Application Priority Data

Mar. 28, 2019 (JP) .............................. JP2019-062855

(51) Int. Cl.
*H04N 1/04* (2006.01)
*H04N 1/00* (2006.01)

(52) U.S. Cl.
CPC ....... *H04N 1/0057* (2013.01); *H04N 1/00206* (2013.01)

(58) Field of Classification Search
CPC .......................... H04N 1/0057; H04N 1/00206
USPC ...................................................... 358/1.12
See application file for complete search history.

(56) References Cited

U.S. PATENT DOCUMENTS

| 7,113,846 B2 * | 9/2006 | Moriyama | ........... G03G 15/655 270/58.14 |
| 8,045,190 B2 * | 10/2011 | Sakabe | .............. G03G 15/6502 358/1.13 |
| 2001/0021036 A1 * | 9/2001 | Nimura | .............. H04N 1/00639 358/1.12 |
| 2018/0348689 A1 | 12/2018 | Ando et al. | |

(Continued)

FOREIGN PATENT DOCUMENTS

| JP | 2001-171894 A | 6/2001 |
| JP | 2003-221160 A | 8/2003 |

OTHER PUBLICATIONS

Akinobu Nishikata et al., U.S. Appl. No. 16/850,050, filed Apr. 16, 2020.

(Continued)

*Primary Examiner* — Cheukfan Lee
(74) *Attorney, Agent, or Firm* — Venable LLP

(57) ABSTRACT

An image forming system includes a first feeding portion configured to feed a recording sheet, a second feeding portion configured to feed an inserting sheet from one of a plurality of supporting portions, and a controller capable of executing a feed-before-detection mode in which a feeding process of a current recording sheet is started before a detection portion detects whether or not a last preceding inserting sheet is present on a supporting portion selected as a feeding source of an inserting sheet from among the plurality of supporting portions. The controller is configured to start the feeding process of the current recording sheet in the feed-before-detection mode and cause the second supporting portion to feed the last preceding inserting sheet.

7 Claims, 14 Drawing Sheets

(56) References Cited

U.S. PATENT DOCUMENTS

2019/0049892 A1     2/2019  Yokoya et al.
2019/0168982 A1*    6/2019  Yamamoto ............. B65H 31/24
2020/0307274 A1*   10/2020  Yumoto ............... B41J 13/0009

OTHER PUBLICATIONS

Riki Fukuhara et al., U.S. Appl. No. 16/826,647, filed Mar. 23, 2020.
Koji Yumoto et al., U.S. Appl. No. 16/824,782, filed Mar. 20, 2020.

* cited by examiner

FIG.4A

[SHORTCUT TO SETTING/REGISTRATION] — 11

⟨INSERTER (BOTTOM): SHEET TYPE⟩
PLEASE SELECT THE TYPE OF SHEET

| NAME | GRAMMAGE | SIZE |
|---|---|---|
| ☑ W Standard White - 8.5×11 | 75 g/m2 | LTR |
| ☑ LZX Laser24 - 11×17 | 90 g/m2 | 11×17 |
| ☑ LZ Laser 24 - 8.5×11 | 90 g/m2 | LTR |
| ☐ THIN PAPER 2 (62~63g/m2) | 58 g/m2 | NO SETTING |
| ☐ THIN PAPER 1 (64~79g/m2) | 72 g/m2 | NO SETTING |
| ☐ REGULAR PAPER 1 (80~90g/m2) | 85 g/m2 | NO SETTING |
| ☐ REGULAR PAPER 2 (91~105g/m2) | 98 g/m2 | NO SETTING |

○ ALL ▼  • SORT LIST  REGISTERED (DESCENDING ORDER) ▼

14/22

[TO SIMPLE SETTING] [DETAILED INFORMATION]

110

[NEXT ►] — 111

FIG.4B

[SHORTCUT TO SETTING/REGISTRATION] — 11

⟨INSERTER (BOTTOM): SHEET SIZE⟩ 112

• A/B SIZE

| A4 | 305×457mm |
| A4⊞ | 320×450mm (SRA3) |
| A3 | 330×483mm |
| B4 | |
| B5 | |
| B5⊞ | [USER SETTING SIZE] |

ON/OFF OF AUTOMATIC SWITCHING OF INSERTER

[ON] — 113
[OFF] — 114

[TO INCH SIZE]

[◄ BACK]  [OK] — 115

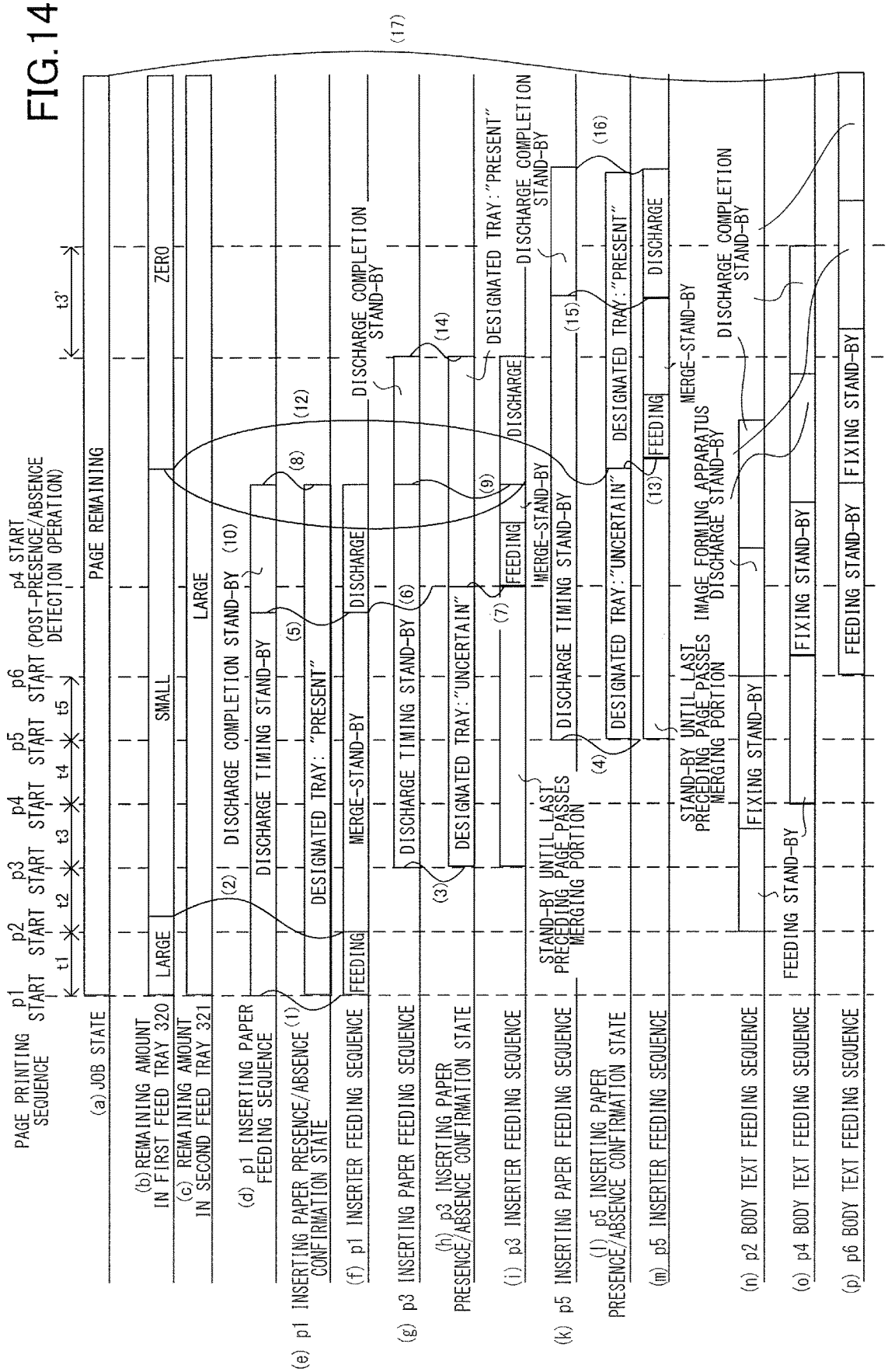

IMAGE FORMING SYSTEM

BACKGROUND OF THE INVENTION

Field of the Invention

The present invention relates to an image forming system that forms an image on a sheet.

Description of the Related Art

Conventionally, an image forming system including an inserter, which feeds a sheet such as inserting paper, in addition to a feeding portion that feeds a sheet serving as a recording medium, and capable of outputting a product in a state in which the inserting paper is inserted between sheets on which images have been formed is known.

Japanese Patent Laid-Open No. 2003-221160 discloses two operations including pre-presence/absence-detection operation and post-presence/absence-detection operation. In the pre-presence/absence-detection operation, feeding of recording paper is started in a state in which whether or not inserting paper that should be inserted immediately before the transfer paper is present in the inserter. In the post-presence/absence-detection operation, feeding of the transfer paper is started after confirming that the inserting paper that should be inserted immediately before the transfer paper is present in the inserter. Although the pre-presence/absence-detection operation is superior in terms of productivity, in the case where the inserting paper is frequently inserted, there is a possibility that the inserting paper that should be inserted immediately before the transfer paper is run out before the transfer paper reaches the inserter and the print job is stopped. Therefore, Japanese Patent Laid-Open No. 2003-221160 proposes performing the pre-presence/absence-detection operation when the amount of inserting paper remaining in an inserting paper tray provided in the inserter is large, and switching the operation to post-presence/absence-detection operation when the amount of inserting paper remaining in the inserting paper tray is small. However, in this method, a period from the time when the amount of inserting paper remaining in the inserting paper tray has become small to a time when the inserting paper tray is replenished with inserting paper, the productivity of the image forming system is low.

In addition, an image forming system described in Japanese Patent Laid-Open No. 2001-171894 includes a plurality of trays on each of which inserting paper is supported, and is configured to automatically switch the tray from which inserting paper is fed. According to Japanese Patent Laid-Open No. 2001-171894, in the case where the inserter operates in a specific mode, which is an F-placement mode, when the inserting paper supported on one tray is run out, the execution of a job is continued by feeding inserting paper from another tray.

SUMMARY OF THE INVENTION

The present invention provides an image forming system that can achieve improvement in productivity.

According to one aspect of the invention, an image forming system includes: a first feeding portion configured to feed a recording sheet; an image forming portion configured to form an image on a recording sheet fed from the first feeding portion; a sheet conveyance path through which a recording sheet on which an image has been formed by the image forming portion; a second feeding portion including a plurality of supporting portions each configured to support an inserting sheet, the second feeding portion being configured to feed an inserting sheet from one of the plurality of supporting portions toward the sheet conveyance path; a detection portion configured to detect information about presence/absence of an inserting sheet supported on the plurality of supporting portions; and a controller configured to execute a job including a feeding process of causing the first feeding portion to feed a recording sheet and causing the image forming portion to form an image and a process of causing the second feeding portion to feed an inserting sheet to be inserted between a plurality of recording sheets, wherein the controller is capable of executing a feed-before-detection mode in a case of performing the feeding process on a recording sheet subsequent to an inserting sheet in an order of passing through the sheet conveyance path, wherein, in the feed-before-detection mode, the feeding process of a current recording sheet is started before the detection portion detects whether or not a last preceding inserting sheet is present on a supporting portion selected as a feeding source of an inserting sheet from among the plurality of supporting portions, the current recording sheet being a recording sheet to be fed this time, the last preceding inserting sheet being an inserting sheet to be inserted immediately before the current recording sheet, and wherein the controller is configured to, in a case where a first supporting portion among the plurality of supporting portions has been selected as the feeding source of an inserting sheet for execution of the job and the detection portion has detected that an inserting sheet is present on a second supporting portion different from the first supporting portion among the plurality of supporting portions, start the feeding process of the current recording sheet in the feed-before-detection mode and cause the second supporting portion to feed the last preceding inserting sheet.

Further features of the present invention will become apparent from the following description of exemplary embodiments with reference to the attached drawings.

BRIEF DESCRIPTION OF THE DRAWINGS

FIGS. 4A and 4B each illustrates a setting screen for inserting paper according to the first exemplary embodiment.

FIG. 14 is a timing chart illustrating an operation example of the image forming system according to the second exemplary embodiment.

DESCRIPTION OF THE EMBODIMENTS

Exemplary embodiments of the present invention will be described below with reference to drawings.

First Exemplary Embodiment

Figure 1:
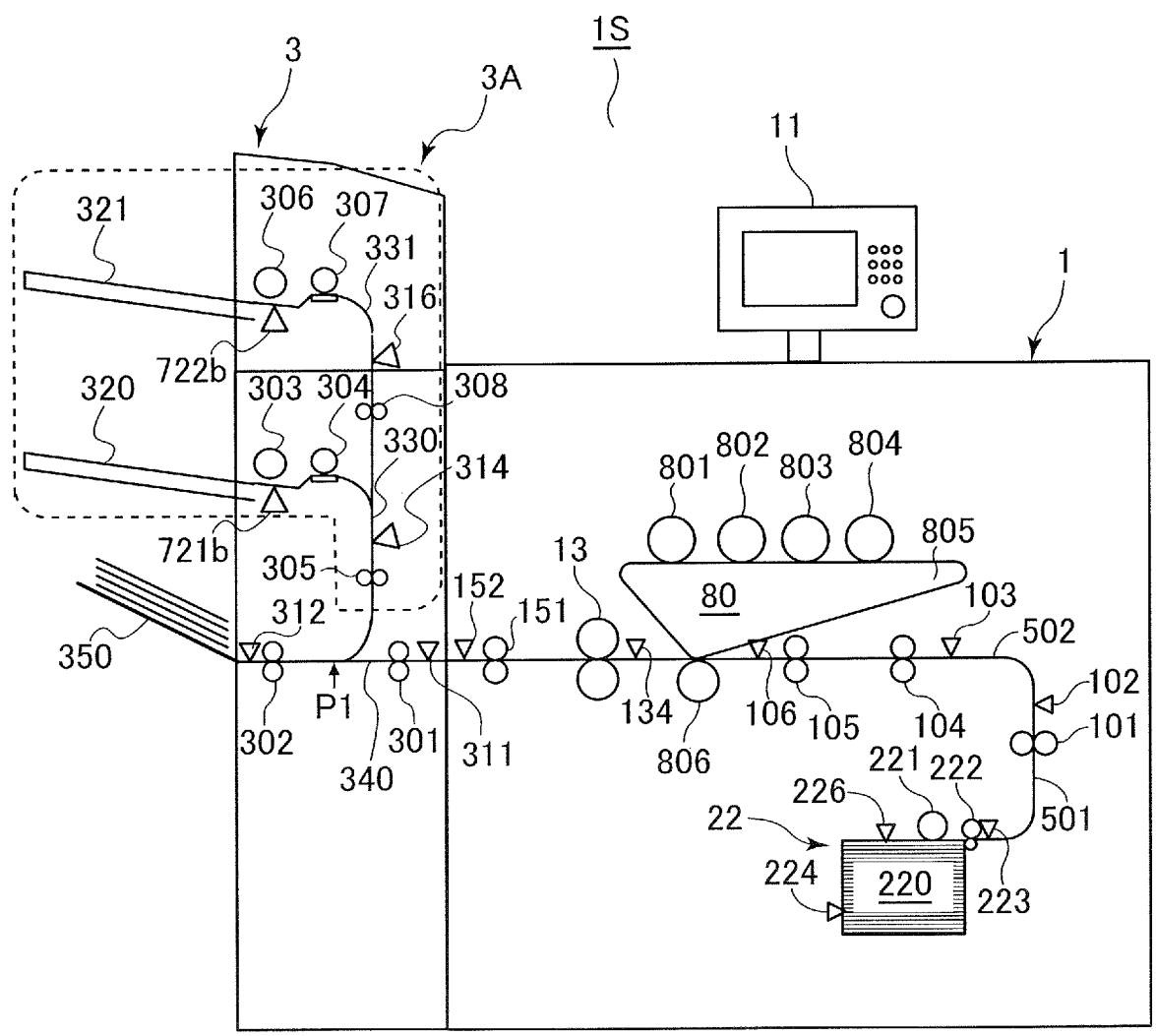
FIG. 1 is a schematic diagram illustrating an image forming apparatus according to a first exemplary embodiment.

FIG. 1 is a schematic view of an image forming system 1S according to a first exemplary embodiment. The image forming system 1S is constituted by an image forming apparatus 1 including an image forming portion 80, and an inserting apparatus 3 connected to the image forming apparatus 1. The inserting apparatus 3 will be hereinafter referred to as an inserter.

The image forming apparatus 1 includes a user interface 11, and a user gives a print instruction such as copying through this. When the user gives a print instruction, sheets are fed one by one from a feeding portion 22 accommodating a plurality of sheets. Examples of a sheet used as a recording medium, that is, a recording sheet, include sheets of various sizes and materials including paper sheets such as regular paper sheets and cardboards, plastic films such as sheets for overhead projectors, sheets of special shapes such as envelops and index sheets, and cloths.

The feeding portion 22 serving as a first feeding portion of the present exemplary embodiment includes a storage chamber 220, a pickup roller 221, and a feed roller pair 222. The sheets are placed in the storage chamber 220. The storage chamber 220 includes a lift plate that is lifted and lowered by an unillustrated lift motor, and a sheet surface sensor 226, and the position of the lift plate is controlled such that the uppermost sheet is in contact with the pickup roller 221. A storage chamber remaining amount detection sensor 224 is a sensor that detects the remaining amount of sheets placed in the storage chamber 220 being small, and for the storage chamber remaining amount detection sensor 224, an optical sensor that radiates light onto a sheet supported on the lift plate can be used. In this case, it can be determined that the sheet remaining amount is large when light to a light receiving portion of the sensor is blocked by the sheet, and it can be determined that the sheet remaining amount is small when the light receiving portion of the sensor detects the light.

The pickup roller 221 delivers the uppermost sheet in the storage chamber 220 to the feed roller pair 222. The feed roller pair 222 is a roller pair including an upper roller and a lower roller, and separates and feeds a sheet from a plurality of sheets as a result of the upper roller rotating in a feeding direction and the lower roller rotating in a returning direction.

A feed sensor 223 is disposed downstream of the feed roller pair 222 in a sheet conveyance direction from the storage chamber 220 toward the image forming portion 80. The image forming apparatus 1 confirms, by using the feed sensor 223, whether or not the uppermost sheet has been picked up at a predetermined timing. In the case where the feed sensor 223 is not in an ON state even after a predetermined time since the start of pickup of the uppermost sheet by the pickup roller 221, that is, in the case where the sensor does not detect the sheet, it is determined that the pickup of the sheet has failed, and the conveyance operation is stopped. In addition, also in the case where the trailing end of the sheet does not pass the feed sensor 223 and the output of the sensor is not OFF even after a predetermined time since the start of the pickup, it is determined that the sheet is not successfully conveyed and is stagnating, and the conveyance operation is stopped. This state will be hereinafter referred to as "stagnation jam". The sheet having passed through the feed roller pair 222 is conveyed to a vertical path 501. The sheet having passed a path sensor 102 by a vertical path roller 101 is guided to a horizontal path 502 along which the image forming portion 80 is disposed, and is subjected to image formation by the image forming portion 80.

The image forming portion 80 is an electrophotographic unit of an intermediate transfer system including four drums 801, 802, 803, and 804, and an intermediate transfer belt 805. The drums 801 to 804 are each a photosensitive member of a drum shape, and a toner image is formed on each of the drums 801 to 804 by an electrophotographic process when the image forming portion 80 performs an image forming operation. That is, after the surface of the rotating drum is uniformly charged by a charting unit, an exposing unit radiates light to the surface of the drum on the basis of image information transmitted as a video signal, and thus an electrostatic latent image is drawn on the surface of the drum. This electrostatic latent image is developed by a toner supplied from a developing unit, and is visualized as a toner image. The toner images born on the drums 801 to 804 are transferred onto the intermediate transfer belt 805 serving as an intermediate transfer member through primary transfer, and are then transferred onto the sheet in a secondary transfer portion formed between the intermediate transfer belt 805 and a secondary transfer roller 806.

In the horizontal path 502, a pre-registration sensor 103, a pre-registration roller 104, a registration roller 105, and a registration sensor 106 are provided. The driving start timings and driving speeds of the rollers 104 and 105 are respectively adjusted on the basis of timings when the sensors 103 and 106 detect the sheet. As a result of this, the image to be transferred onto the sheet through secondary transfer in the secondary transfer portion is positioned in the sheet conveyance direction with respect to the leading end of the sheet, that is, the downstream end of the sheet in the sheet conveyance direction. For such positioning of the transfer image with respect to the leading end of the sheet, a configuration in which the registration roller 105 is driven on the basis of a signal synchronized with image formation, particularly a signal synchronized with the start of drawing of the electrostatic latent image by the exposing unit, is widely known.

The image transferred onto the sheet is subjected to a fixing process by passing through a fixing unit 13. The fixing unit 13 includes a rotary member pair that nip the sheet, and a heat generating element such as a halogen lamp, and pressurizes and heats the image on the sheet while conveying the sheet. As a result of this, toner particles melt and then adhere to the sheet, and thus an image fixed to the sheet is obtained.

The image to which an image has been fixed is discharged toward the inserter 3 by a discharge roller 151. A discharge sensor 152 confirms whether or not the sheet has been passed onto the inserter 3 at a predetermined timing. In the case where the discharge sensor 152 does not detect the passing of the sheet even after the predetermined timing, it is determined that stagnation jam in which the sheet is stagnating has occurred, and the conveyance operation is stopped.

The image forming portion 80 described above is an example of an image forming portion configured to form an image on a sheet, and may be replaced by an electrophotographic unit of a direct transfer system that directly transfers an image from a photosensitive member onto the sheet, an image forming unit of an inkjet system, or the like. In addition, a configuration in which the image forming apparatus 1 includes a plurality of storage chambers including the storage chamber 220 as first feeding portions may be employed, and an optional feeder that feeds a sheet accommodated in a storage chamber to the image forming apparatus 1 may be connected to the image forming apparatus 1.

Inserter

The inserter 3 includes an entrance roller 301, an entrance sensor 311, a horizontal path 340, a discharge roller 302, a discharge sensor 312, and a discharge tray 350. The horizontal path 340 is connected to the horizontal path 502 of the image forming apparatus 1, and extends approximately horizontally in the inside of the inserter 3 in front view of the image forming system 1S, that is, as viewed in the perspective of FIG. 1. The horizontal path 340 is a sheet conveyance path of the present exemplary embodiment through which the sheet on which an image has been formed by the image forming portion 80 is conveyed. The entrance roller 301 and the entrance sensor 311 are disposed at an upstream end portion of the horizontal path 340 in the sheet conveyance direction in the horizontal path 340, that is, from the right to the left in FIG. 1, and the discharge roller 302 and the discharge sensor 312 are disposed at a downstream end portion of the horizontal path 340. The discharge tray 350 is disposed at a side portion on the opposite side to the image forming apparatus 1 in the horizontal direction.

The sheet on which an image has been formed by the image forming apparatus 1 is passed onto an opening portion of the horizontal path 340 of the inserter 3 via the discharge roller 151. When the entrance sensor 311 detects that the sheet discharged from the image forming apparatus 1 has entered the inserter 3, the entrance roller 301 is driven and the sheet is conveyed through the horizontal path 340. When the sheet passes the discharge roller 302, the sheet is discharged onto the discharge tray 350 as it is. The discharge sensor 312 is a sensor that detects whether or not the sheet has been normally discharged onto the discharge tray 350.

A configuration for conveying a recording sheet on which an image has been formed by the image forming apparatus 1 has been described above. A configuration for the inserter 3 to convey an inserting sheet will be described below.

An inserting sheet refers to a sheet inserted by the inserter 3 and different from the recording sheet on which an image has been formed by the image forming apparatus 1, among sheets stacked on the discharge tray 350 as a product by the image forming system 1S. Examples of the inserting sheet include a sheet inserted each time a certain number of recording sheets are output, for indicating the number of sheets, and a sheet generally called a slip sheet that is inserted to suppress offset of an image of a recording sheet to another. In addition, examples of the inserting sheet include sheets that constitute the final product together with the recording sheets on which images have been formed by the image forming apparatus 1, such as, chapter title pages, interleaves, and preprinted pages prepared in a different printing batch to be inserted between the sheets on which images have been formed by the image forming apparatus 1.

In the description below, inserting sheets fed from the inserter 3 will be referred to as "inserting paper" regardless of the purpose of use thereof. To be noted, similarly to the recording sheets, the inserting paper may be a sheet material different from paper. In addition, the recording sheets on which images have been formed by the image forming apparatus 1 normally serve as the main part of the product output by the image forming system 1S and will be referred to as "body texts" or "body text pages" to be distinguished from the inserting paper.

The inserter 3 includes an inserting paper feeding portion 3A that feeds inserting paper placed in a feed tray toward the horizontal path 340 through which the sheets on which images have been formed by the image forming apparatus 1 are conveyed. In the present exemplary embodiment, a plurality of feed trays is provided. In the illustrated example, two feed trays are provided. In the case where the feeding portion 22 of the image forming apparatus 1 serves as a first feeding portion of the present exemplary embodiment, the inserting paper feeding portion 3A serves as a second feeding portion of the present exemplary embodiment.

The inserting paper feeding portion 3A includes a first feed tray 320, a first feed roller 303, a first separation roller 304, a first conveyance path 330, a first feed sensor, a first path sensor 314, and a registration roller 305. The first feed tray 320 serves as a first supporting portion of the present exemplary embodiment, and the first feed roller 303 serves as a first feeding unit of the present exemplary embodiment.

The first feed roller 303 rotates in contact with the uppermost sheet of the inserting paper placed on the first feed tray 320, and thus feeds the inserting paper. The first separation roller 304 is a conveyance roller in contact with a separation member of a pad shape, and conveys the inserting paper received from the first feed roller 303 to a first conveyance path 330 in a state in which each sheet is separated from another. The inserting paper being fed from the first feed tray 320 is detected by the first feed sensor disposed in the vicinity of the first feed roller 303. The first conveyance path 330 merges, at a downstream end thereof in the sheet conveyance direction, with the horizontal path 340 in which the recording sheet received from the image forming apparatus 1 is conveyed.

The inserting paper delivered into the first conveyance path 330 stands by in a state of abutting the registration roller 305 disposed in the first conveyance path 330. This will be referred to as merge-stand-by. As a result of the leading end of the inserting paper abutting the registration roller 305 in a stopped state and the inserting paper warping to form a loop, the inclination of the inserting paper caused when the inserting paper is set on the first feed tray 320 and the skew of the inserting paper caused in the feeding operation are corrected. To be noted, after the leading end of the inserting paper is detected by the first path sensor 314 disposed in the first conveyance path 330, the driving of the separation roller 304 is stopped at a preset timing such that the inserting paper abuts the registration roller 305 and forms a loop of a predetermined amount. Then, the driving of the registration roller 305 and the separation roller 304 is started on the basis of a timing signal received by the inserter 3 from the image forming apparatus 1, and thus the inserting paper is pulled into the horizontal path 340 through a merging portion between the first conveyance path 330 and the horizontal path 340. Then, the inserting paper is discharged to the outside of the inserter 3 by the discharge roller 302, and is stacked on the discharge tray 350 together with the sheets on which images have been formed by the image forming apparatus 1.

In addition, the inserting paper feeding portion 3A includes a second feed tray 321, a second feed roller 306, a second separation roller 307, a second conveyance path 331, a second feed sensor, and a second path sensor 316. The second feed tray 321 serves as a second supporting portion of the present exemplary embodiment, and the second feed roller 306 serves as a second feeding unit of the present exemplary embodiment.

The second feed tray 321 is provided above the first feed tray 320. The second feed roller 306 rotates in contact with the uppermost sheet of the inserting paper placed on the second feed tray 321, and thus feeds the inserting paper. The second separation roller 307 is a conveyance roller in contact with a separation member of a pad shape, and conveys the inserting paper received from the second feed roller 306 to a second conveyance path 331 in a state in which each sheet is separated from another. The inserting paper being fed from the second feed tray 321 is detected by the second feed sensor disposed in the vicinity of the second feed roller 306. The second conveyance path 331 communicates with the first conveyance path 330 at a downstream end thereof in the sheet conveyance direction.

The conveyance operation of the inserting paper fed from the second feed tray 321 and delivered into the first conveyance path 330 is substantially the same as in the case of the inserting paper fed from the first feed tray 320. That is, after the inserting paper is caused to abut the registration roller 305 and merge-stand-by, the conveyance is resumed on the basis of the timing signal received by the inserter 3 from the image forming apparatus 1, and thus the inserting paper is delivered into the horizontal path 340.

To be noted, in the present exemplary embodiment, description will be given on the premise that the final product of the image forming system 1S is supported on the discharge tray 350 of the inserter 3. However, in addition to the inserter 3, the image forming system 1S may also include a sheet processing apparatus that performs processing such as binding (stapling) processing or bookbinding processing on the sheets on which images have been formed by the image forming apparatus 1, or a stacker capable of supporting a large amount of products thereon. In such a case, a sheet discharged from the inserter 3 may be discharged to a discharge portion provided in a unit different from the inserter 3. In addition, a relay unit may be disposed between the image forming apparatus 1 and the inserter 3, and the sheets on which images have been formed by the image forming apparatus 1 may be received by the inserter 3 via the relay unit. Therefore, the present exemplary embodiment is applicable regardless of whether or not the inserter 3 is directly connected to the image forming apparatus 1.

Figure 2:
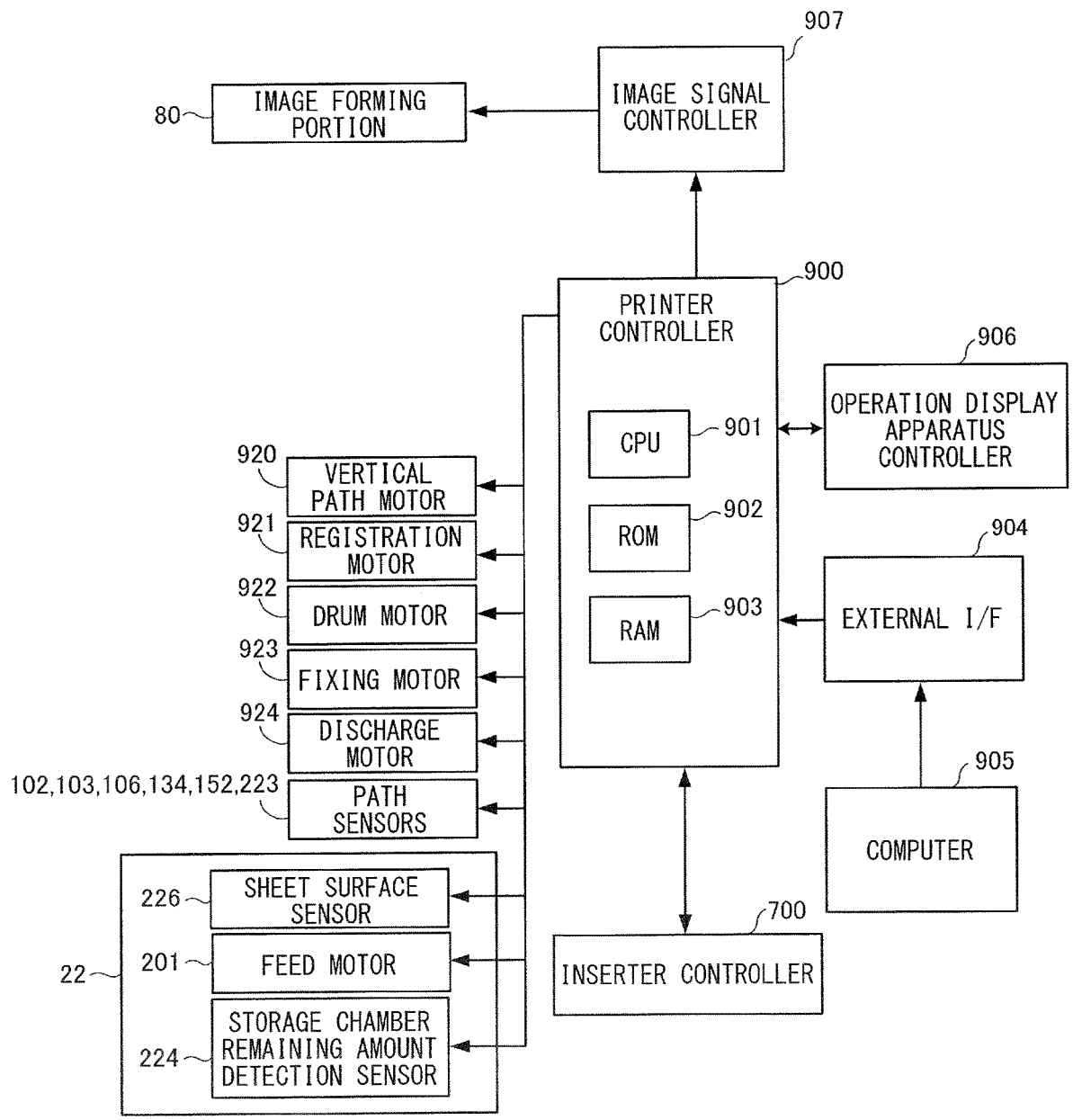
FIG. 2 is a block diagram illustrating a control system of an image forming apparatus according to the first exemplary embodiment.

FIG. 2 is a block diagram illustrating a configuration of a controller that is in charge of the overall control of the image forming system 1S of the present exemplary embodiment. The controller of the image forming system 1S of the present exemplary embodiment includes a printer controller 900 included in the image forming apparatus 1 and an inserter controller 700 included in the inserter 3.

The printer controller 900 includes a central processing unit: CPU 901, a read-only memory: ROM 902, and a random access memory: RAM 903. The CPU 901, serving as an execution portion of a control program, reads out and executes the control program stored in the ROM 902, and performs overall control of the image forming apparatus 1 in cooperation with an image signal controller 907 and an operation display apparatus controller 906.

The RAM 903 temporarily stores control data, and is used as a work space for arithmetic processing for control. The image signal controller 907 performs various processing on a digital image signal input from an external computer 905 through an external interface: external I/F 904 to convert this digital image signal into a video signal, and outputs the video signal to the image forming portion 80.

The operation display apparatus controller 906 controls the user interface 11 illustrated in FIG. 1, and communicates information with the printer controller 900. The user interface 11 includes an input device such as a plurality of keys or a touch panel function of a display for setting various functions related to image formation, and a display apparatus such as a liquid crystal display that displays information of setting state. In addition, the user interface 11 outputs a key signal corresponding to operation on each key to the printer controller 900, and displays information corresponding to a signal from the printer controller 900 on the display portion.

Next, a main sheet conveyance driving system of the image forming apparatus 1 will be described with reference to FIGS. 1 and 2. As drive sources from the feeding portion 22 to the vertical path 501, a feed motor 201 that drives the pickup roller 221, and a vertical path motor 920 that drives the feed roller pair 222 and the vertical path roller 101 are provided. As a drive source from the horizontal path 502 to the secondary transfer portion, a registration motor 921 that drives the pre-registration roller 104 and the registration roller 105 is provided. As drive sources from the secondary transfer portion to the discharge portion, a drum motor 922, a fixing motor 923, and a discharge motor 924 are provided. The drum motor 922 drives the drums 801 to 804, the intermediate transfer belt 805, and the secondary transfer roller 806 of the image forming portion 80. The fixing motor 923 drives the fixing unit 13. The discharge motor 924 drives the discharge roller 151.

In addition, the image forming apparatus 1 includes path sensors 102, 103, 106, 134, 152, and 223 provided at respective positions along the conveyance path as sensors for detecting the conveyance state of the sheet. Among these, the pre-fixation path sensor 134 illustrated in FIG. 1 is a sensor that detects the sheet at a position between the secondary transfer portion and the fixing unit 13, particularly immediately before the fixing unit 13. The printer controller 900 receives input signals from these sensors, and thus monitors whether or not the sheet is conveyed on a planned schedule, that is, whether or not a jam has occurred.

Figure 3:
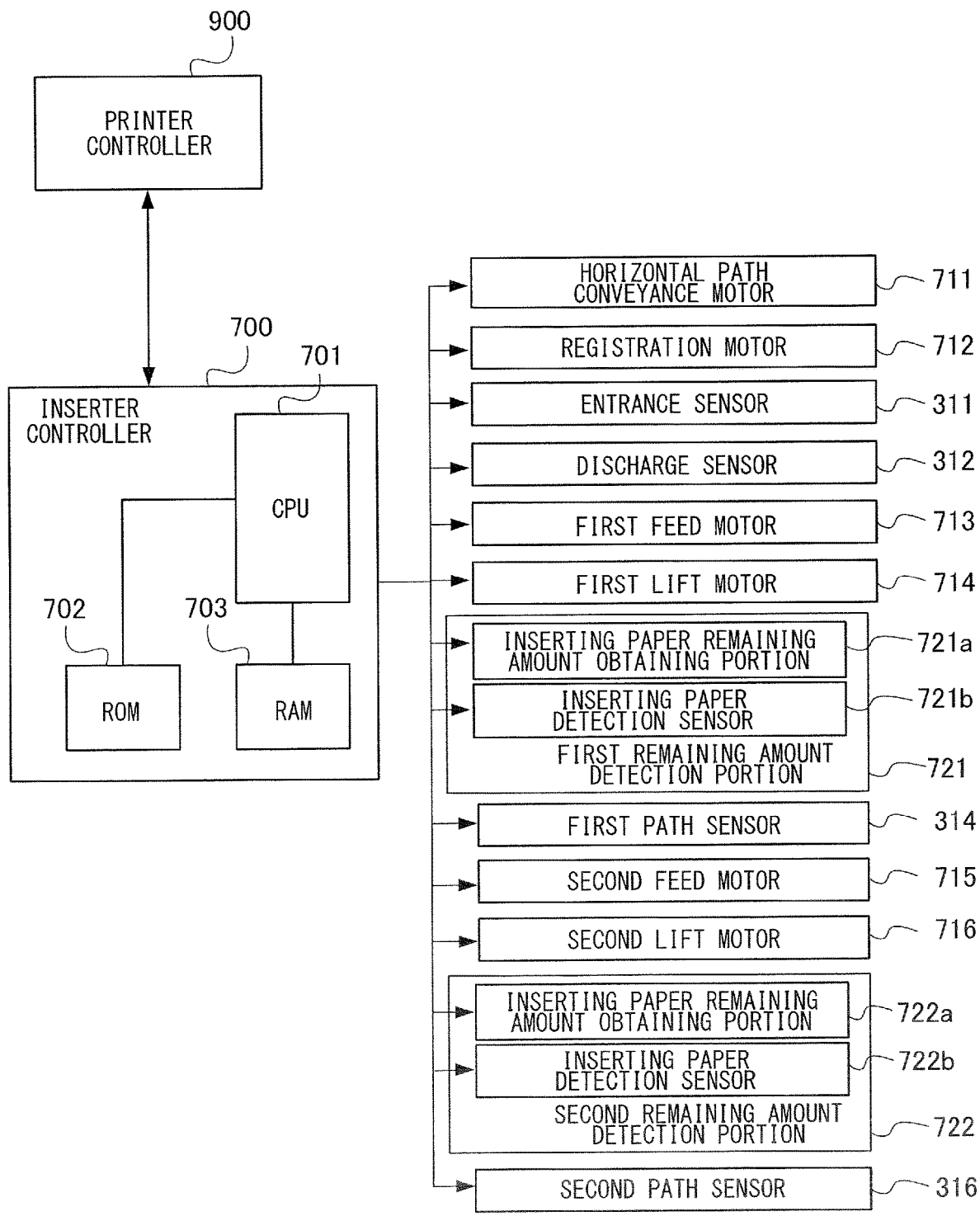
FIG. 3 is a block diagram illustrating a control system of an inserter according to the first exemplary embodiment.

Next, the inserter controller 700 will be described with reference to FIG. 3. The inserter controller 700 includes a CPU 701, a ROM 702, and a RAM 703. The CPU 701 reads out and executes a control program stored in the ROM 702, and thus controls the inserter 3. The RAM 703 temporarily stores control data, and is used as a work space for arithmetic processing for control. In addition, the inserter controller 700 is mutually communicable with the printer controller 900, and is capable of receiving an operation instruction from the printer controller 900 and transmitting a notification related to the operation state of the inserter 3 to the printer controller 900.

The inserter controller 700 and the printer controller 900 that work in cooperation serve as a controller or a control circuit that controls the image forming system 1S of the present exemplary embodiment. The ROM 702 and 902 that store control programs executed by the CPU 701 and 901 of the respective controllers serve as examples of a non-transitory computer readable storage medium storing a control program for controlling an image forming system.

Next, a main sheet conveyance driving system of the inserter 3 will be described with reference to FIGS. 1 and 3. As a drive source for conveying a sheet received from the image forming apparatus 1 toward the discharge tray 350, a horizontal path conveyance motor 711 that drives the entrance roller 301 and the discharge roller 302 is provided. As a drive source for conveyance from feeding of the inserting paper from the first feed tray 320 to skew correction in the first conveyance path 330, a first feed motor 713 that drives the first feed roller 303 and the first separation roller 304 is provided. As a drive source for lifting and lowering the lift plate provided in the first feed tray 320 to bring the uppermost sheet of the inserting paper on the tray into contact with the first feed roller 303, a first lift motor 714 is provided.

In addition, as a drive source that drives the second feed roller 306 and the second separation roller 307, a second feed motor 715 is provided. As a drive source for lifting and lowering the lift plate provided in the second feed tray 321 to bring the uppermost sheet of the inserting paper on the tray into contact with the second feed roller 306, a second lift motor 716 is provided. As a drive source for conveyance to the merging portion with the image forming apparatus 1 after correcting the skew of the inserting paper fed from the first feed tray 320 and the second feed tray 321, a registration motor 712 that drives the registration roller 305 is provided. Then, the inserter controller 700 is connected to the sensors 311 to 316 provided in the inserter 3 described above, and determines the conveyance state of the sheet in the inserter 3 on the basis of the detection signal of each sensor.

In addition, in the inserter 3, a first remaining amount detection portion 721 and a second remaining amount detection portion 722 are provided as detection portions that detect information about remaining amounts of sheets in a plurality of supporting portions included in the inserter 3. The first remaining amount detection portion 721 includes an inserting paper remaining amount obtaining portion 721a that obtains an inserting paper remaining amount in the first feed tray 320, and an inserting paper detection sensor 721b that detects inserting paper on the first feed tray 320. In addition, the second remaining amount detection portion 722 includes an inserting paper remaining amount obtaining portion 722a that obtains an estimated value of an inserting paper remaining amount in the second feed tray 321, and an inserting paper detection sensor 722b that detects inserting paper on the second feed tray 321. The inserting paper remaining amount obtaining portions 721a and 722a serve as remaining amount obtaining portions, that is, a first remaining amount obtaining portion and a second remaining amount obtaining portion of the present exemplary embodiment, and the inserting paper detection sensors 721b and 722b serve as presence/absence detection portions, that is, a first presence/absence detection portion and a second presence/absence detection portion of the present exemplary embodiment.

For the inserting paper detection sensors 721b and 722b, sensors that optically detect the presence of the inserting paper can be used. For example, as the inserting paper detection sensors 721b and 722b, photo reflectors which each include a light emitting portion that radiates detection light upward with respect to the supporting surface of the tray and a light receiving portion that detects reflection light from an object and in which the output of the light receiving portion changes depending on the presence/absence of the inserting paper on the tray can be used.

In addition, the inserting paper remaining amount obtaining portions 721a and 722a are capable of respectively obtaining estimated values of the inserting paper remaining amount in the first feed tray 320 and the second feed tray 321 respectively from the drive amounts of the first lift motor 714 and the second lift motor 716. For example, the current height of the lift plate of the first feed tray 320 can be estimated from the accumulated amount of rotation of the first lift motor 714 having rotated to lift the lift plate from a state in which the lift plate is at a stand-by position, that is, the lowest position. When it is known due to the inserting paper detection sensor 721b that at least one sheet of the inserting paper is present, the difference between the height of the first feed roller 303 and the current height of the lift plate corresponds to the height of the stack of the inserting paper, for example. Therefore, the inserting paper remaining amount obtaining portions 721a and 722a are capable of calculating estimated values of the current sheet remaining amount by, for example, obtaining the accumulated amount of rotation of the motors from output signals of rotary encoders provided in the first lift motor 714 and the second lift motor 716. The function of the inserting paper remaining amount obtaining portions 721a and 722a can be implemented as a part of a program executed by the CPU 701.

The first remaining amount detection portion 721 and the second remaining amount detection portion 722 exemplified herein are examples of detection portions, and a detection portion that detects information about presence/absence of the inserting paper by a different detection method may be provided. For example, a configuration in which an optical sensor of a light transmission type is disposed above the feed tray, a light blocking portion that blocks light to the optical sensor is provided on a lift plate, and thus a detection signal of the optical sensor changes when the remaining amount of inserting paper is reduced and the lift plate ascends to a predetermined height may be employed.

FIGS. 4A and 4B are examples of setting screens related to inserting paper in the image forming system of the present exemplary embodiment. These setting screens are displayed on the user interface 11 that is an example of an input device. A user is capable of inputting sheet information indicating attributes such as the size and type of the inserting paper to the image forming system by performing operation on these setting screens. To be noted, although setting screens of inserting paper set in the first feed tray 320, which is a lower-tier tray, are illustrated in FIGS. 4A and 4B, information of the inserting paper can be input via similar setting screens also for the second feed tray 321, which is an upper-tier tray.

In the setting screen of sheet type illustrated in FIG. 4A, the type of the inserting paper to be fed from the first feed tray 320 can be selected. In the illustrated screen, "REGULAR PAPER 1 (80-90 g/m²)" of a selection list 110 is selected. When the user presses a "NEXT" button 111 in this state, the screen transitions to a setting screen for the sheet size illustrated in FIG. 4B. In the setting screen for the sheet size, the size of the inserting paper to be fed from the first feed tray 320 can be selected. In the illustrated screen, a button 112 for designating an "A4" size is selected. When the user presses an "OK" button 115 in this state, the inserting paper in the first feed tray 320 is set as "REGULAR PAPER 1" and "A4" in the image forming system, and required information is stored in a storage device of the printer controller 900.

In addition, ON/OFF of an automatic inserter switching function of automatically switching the tray serving as a feeding source of inserting paper can be selected (or, is changeable) in the setting screen for the sheet size by using buttons 113 and 114. The automatic inserter switching function will be hereinafter referred to as automatic switching. In the case where the automatic switching of the inserter is ON, it is allowed to feed inserting paper from a tray different from a tray initially selected as the feeding source of inserting paper during execution of a print job. This state serves as a first state. In the case where the automatic switching of the inserter is OFF, such switching of the tray serving as a feeding source is not allowed. This state serves as a second state. The automatic switching of the tray by the inserter will be described later.

Figure 5:
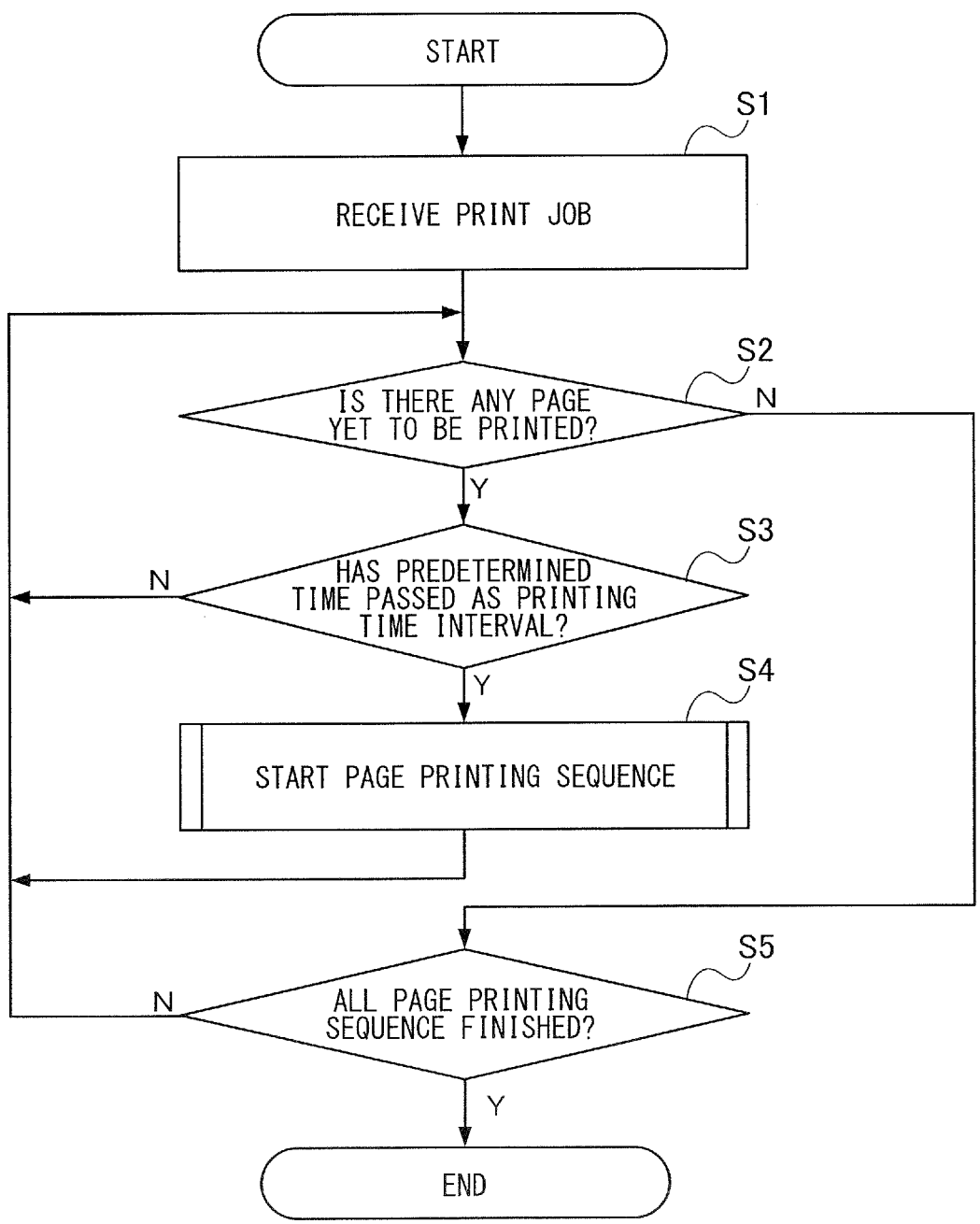
FIG. 5 is a flowchart illustrating an operation of the image forming system according to the first exemplary embodiment.

FIG. 5 is a flowchart illustrating control performed by the printer controller 900 of the present exemplary embodiment. This flow is performed as a result of the CPU 901 reading out and executing a control program describing processing of each step.

When the printer controller 900 receives a print job in step S1, whether or not there is a page whose printing is yet to be started is checked in step S2. The print job, or an image formation job, is a series of tasks for forming an image on a recording sheet by the image forming portion 80. Reception of the print job corresponds to the printer controller 900 receiving information of an image to be printed and a command for the start of printing from an external computer, or the user instructing start of printing via a user interface.

In the case where there is a page whose printing is yet to be started, a stand-by state is taken until a printing time interval reaches a printing interval of a predetermined value while monitoring the printing time interval by an unillustrated timer in step S3, and a page printing sequence of each page is started in step S4. To be noted, although the details of the page printing sequence will be described later, the page printing sequence is processed in parallel with this flowchart. That is, the page printing sequence for one page is processed in parallel with the page printing sequence for another page. The steps S3 and S4 are repeated as long as there is a page whose printing is yet to be started, and when there is no longer a page whose printing is yet to be started in step S2, whether or not the page printing sequence has been finished for all pages is checked in step S5, and the print job is finished in the case where the page printing sequence has been finished for all pages.

Figure 6:
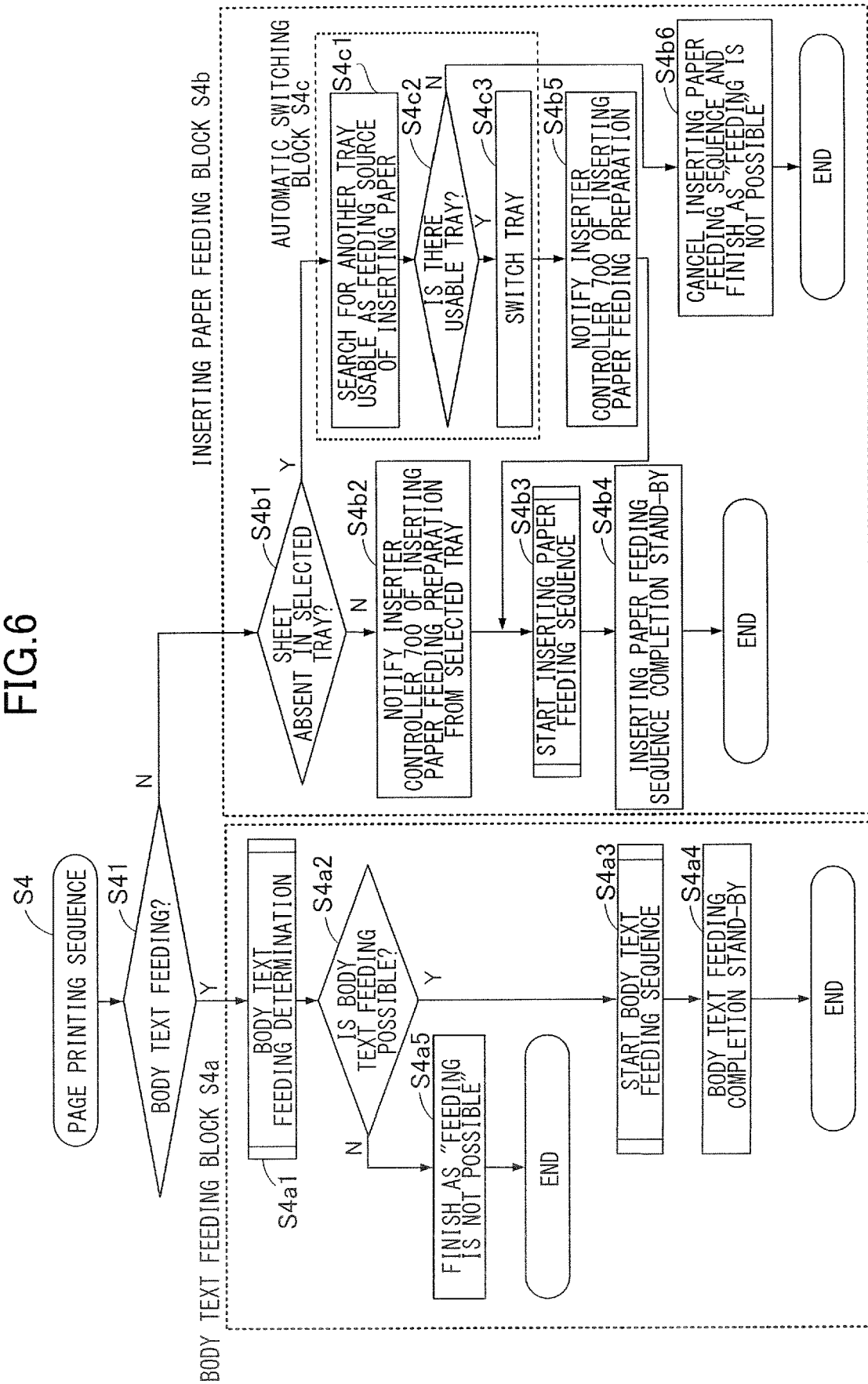
FIG. 6 is a flowchart illustrating a page printing sequence according to the first exemplary embodiment.

FIG. 6 is a flowchart illustrating the page printing sequence, that is, step S4 of FIG. 5, in the image forming apparatus of the present exemplary embodiment. In the page printing sequence, first, whether the printed page serving as a processing target of the present sequence is a body text page or inserting paper is determined in step S41. The process proceeds to a body text feeding block S4a in the case where the printed page is a body text page, and proceeds to an inserting paper feeding block S4b in the case where the printed page is inserting paper.

Body Text Feeding Block

In the body text feeding block S4a, first, body text feeding determination that will be described later is made in step S4a1. In the case where it is determined that "feeding is possible" in step S4a2 in the body text feeding determination, a body text feeding sequence is started in step S4a3. The page printing sequence is finished after waiting for the body text feeding sequence to be completed in step S4a4. In the case where the result of the body text feeding determination is "feeding is not possible" in step S4a2, it is determined that the body text feeding sequence cannot be executed, and the page printing sequence is finished in step S4a5. In this case, occurrence of an error hindering continuation of the print job is notified to the CPU 901, and a measure such as stopping the page printing sequence for a new page, displaying a screen notifying that the printing job is stopped on the user interface 11, or the like is taken.

Figure 7A:
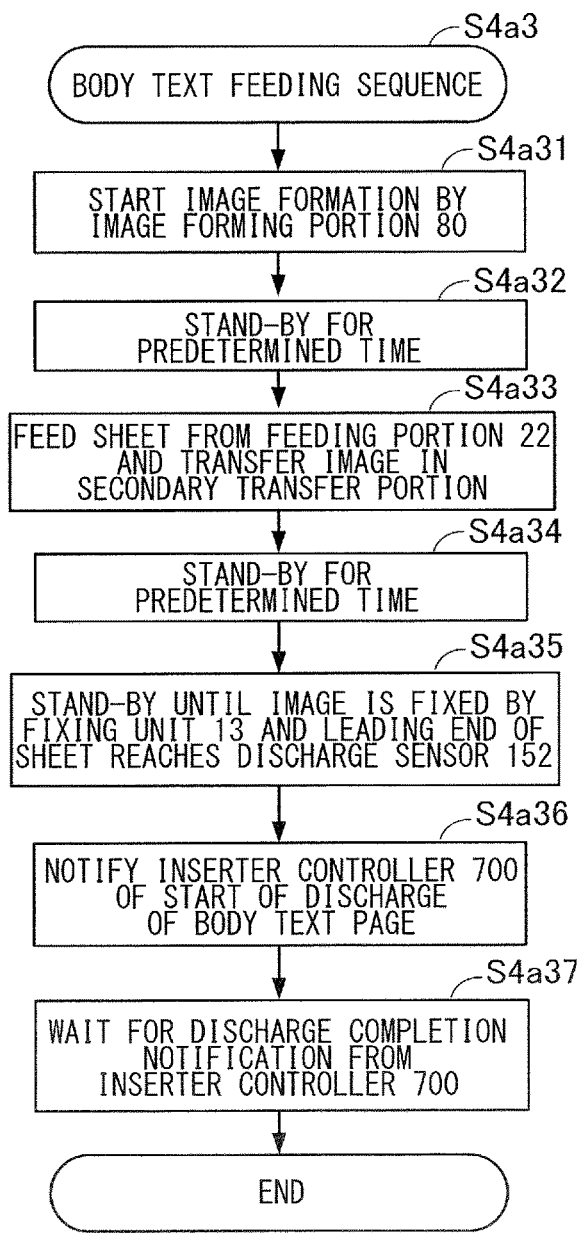
FIG. 7A is a flowchart illustrating a body text feeding sequence according to the first exemplary embodiment.

The flowchart of FIG. 7A illustrates a body text feeding sequence, which is a feeding process of a recording sheet in the present exemplary embodiment. This flow is processed in parallel with the page printing sequence. In the body text feeding sequence, first, an image forming operation is started in step S4a31 by the image forming portion 80 illustrated in FIG. 1, and after waiting for a predetermined time in step S4a32, a sheet feeding operation of feeding a sheet from the feeding portion 22 is started and an image is transferred onto the sheet in the secondary transfer portion in step S4a33. This predetermined time is set such that a timing when the image formed by the image forming portion 80 reaches the secondary transfer portion approximately coincides with a timing when the sheet conveyed from the feeding portion 22 reaches the secondary transfer portion.

The start of the image forming operation refers to the start of drawing of an electrostatic latent image on the drum 801, which is the most upstream drum in the rotation direction of the intermediate transfer belt 805. Meanwhile, the start of the sheet feeding operation by the feeding portion 22 refers to the start of feeding of the sheet from the storage chamber 220 by the pickup roller 221. To be noted, although the start of the image forming operation is set to be earlier than the start of the sheet feeding operation in the present exemplary embodiment, the start of the sheet feeding operation may be earlier than the start of the image forming operation, that is, step S4a31 may be switched with step S4a33, depending on the configuration of the image forming apparatus. Examples of this include a case where an electrophotographic unit of a direct transfer system is used as the image forming portion 80 and the conveyance distance from the storage chamber 220 to the transfer portion is longer than in the present exemplary embodiment. That is, the "start of feeding process" corresponds to start of the earlier one of the image forming operation and sheet feeding operation on the same sheet.

In addition, in the case of an image forming apparatus having a function of forming an image on a first surface of the recording sheet, then inverting the sheet, and forming an image on a second surface of the sheet, the body text feeding sequence is performed on each sheet surface. That is, the body text feeding sequence is performed on the first surface in the case where the result of the body text feeding determination on the first surface is "feeding is possible", and in addition to this, the body text feeding sequence is performed on the second surface in the case where the result of the body text feeding determination on the second surface is "feeding is possible". In the case of an image forming apparatus having such a duplex printing function, a duplex conveyance portion that delivers the inverted recording sheet into the horizontal path 502 along which the image forming portion 80 is disposed constitutes a part of the first feeding portion together with the storage chamber 220 described above. The duplex conveyance portion is also referred to as a re-feeding portion.

After the transfer of the image is started in the secondary transfer portion, further, a stand-by state is taken for a predetermined time in step S4a34 until the sheet conveyed from the secondary transfer portion reaches the fixing unit 13. Then, a fixing process is performed in the fixing unit 13, and a stand-by state is taken in step S4a35 until the leading end of the sheet reaches the discharge sensor 152. When the leading end of the sheet reaches the discharge sensor 152, discharge of the sheet toward the inserter 3 is started, and the start of discharge of a body text page is notified to the inserter controller 700 in step S4a36. When a discharge completion notification indicating that the discharge of the body text page onto the discharge tray 350 of the inserter 3 has been completed is received from the inserter controller 700, the body text feeding sequence is finished in step S4a37.

Inserting Paper Feeding Block

Next, the inserting paper feeding block S4b of the page printing sequence illustrated in FIG. 6 will be described. In the description below, it is assumed that the first feed tray 320 of the inserter 3 is already selected as the tray from which the inserting paper is fed. The tray selected as a feeding source of the inserting paper refers to, for example, a tray explicitly selected by the user via the user interface when inputting the print job, or a tray automatically selected by the inserter controller 700 on the basis of the size or the like of the sheet used as the body text page.

In the inserting paper feeding block S4b, first, it is determined in step S4b1 whether or not inserting paper is absent on the first feed tray 320, which is a currently selected tray. Whether or not inserting paper is absent on the first feed tray 320 is determined on the basis of notification that has been transmitted from the inserter controller 700 to the printer controller 900, for example, in steps S63, S66, and S610 of FIGS. 10A and 10B. In the case where it has been determined that inserting paper is not absent on the currently selected tray, notification of inserting paper feeding preparation is transmitted to the inserter controller 700 in step S4b2 with the currently selected feed tray designated as a feeding source of the inserting paper. As will be described later, the inserter controller 700 having received the notification of the inserting paper feeding preparation performs processing for feeding the inserting paper to the registration roller 305 and causing the inserting paper to merge-stand-by. After transmitting the notification of inserting paper feeding preparation, the inserting paper feeding sequence is started in step S4b3, a stand-by state is taken in step S4b4 until the inserting paper feeding sequence is completed, and then the page printing sequence is finished.

In the case where it is determined in step S4b1 that there is no inserting paper in the currently selected tray, processing of an automatic switching block S4c is performed. First, whether or not there is a tray supporting inserting paper other than the currently selected tray and whether or not there is a feed tray whose sheet information satisfies a predetermined matching condition with the currently selected tray are checked in step S4c1. Whether or not inserting sheet is present on a tray other than the currently selected tray, that is, on the second feed tray 321 in this case, is determined on the basis of the detection result of the inserting paper detection sensor 722b of the second remaining amount detection portion 722. The predetermined matching condition is a condition for determining whether or not the inserting paper on the other tray determined as supporting inserting paper can be used in place of the inserting paper on the currently selected tray, and in the present exemplary embodiment, the matching condition is that the type and size of the inserting paper both match. For example, only matching of the size may be used as the matching condition instead of this.

In the case where at least one sheet of inserting paper is present on the second feed tray 321 and the type and size of the sheet on the second feed tray 321 set via the setting screens illustrated in FIGS. 4A and 4B both match those of the first feed tray 320, it is determined that it is possible to feed inserting paper from the second feed tray 321, that is, the result of step S4c2 is Y. That is, using a second supporting portion as a feeding source of an inserting sheet instead of a first supporting portion is allowed only in the case where first sheet information about a sheet supported on a first supporting portion and second sheet information about a sheet supported on a second supporting portion satisfy a predetermined matching condition. In this case, processing of switching the currently selected tray to the second feed tray 321 is performed in step S4c3, and then notification of inserting paper feeding preparation is transmitted to the inserter controller 700 in step S4b5 so as to feed inserting paper from the feed tray to which the currently selected tray has been switched.

In contrast, in the case where no other tray usable in place of the currently selected tray is found in step S4c2, that is, in the case where the result of step S4c2 is N, the inserting paper feeding sequence is cancelled in step S4b6, and the page printing sequence is finished by determining that feeding cannot be performed. Also in this case, occurrence of an error preventing continuation of the print job is notified to the CPU 901.

In addition, the description above applies to a case where automatic switching is set to ON in the setting screen illustrated in FIG. 4B. In the case where the automatic switching is set to OFF, the automatic switching block S4c is invalidated. That is, in the case where it is determined that inserting paper is not present on the currently selected tray, that is, in the case where the result of S4b1 is Y, in the state in which the automatic switching is OFF, the process skips the automatic switching block S4c and proceeds to step S4b6. Then, the inserting paper feeding sequence is cancelled in step S4b6, and the page printing sequence is finished by determining that feeding cannot be performed.

Figure 7B:
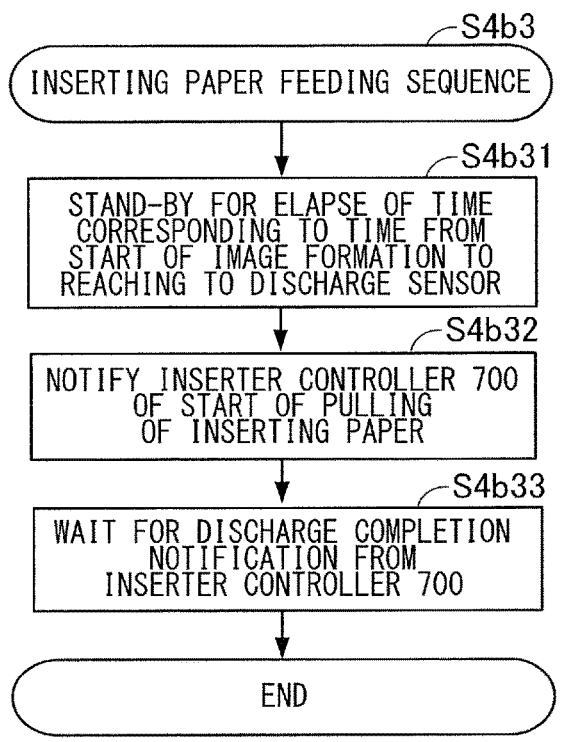
FIG. 7B is a flowchart illustrating an inserting paper feeding sequence according to the first exemplary embodiment.

The flowchart of FIG. 7B illustrates the inserting paper feeding sequence, that is, step S4b3 of FIG. 6. This flow is processed in parallel with the page printing sequence. In the inserting paper feeding sequence, first, a stand-by state is taken in step S4b31 for a time corresponding to a predetermined time from the start of the feeding sequence of the body text page to discharge from the image forming apparatus. This predetermined time is equal to a time from the start of image formation in step S4a31 to reaching of the leading end of the sheet to the discharge sensor 152 in step S4a35 in the body text feeding sequence of FIG. 7A assuming that a body text page is fed instead of inserting paper of this time. After the elapse of the predetermined time, start of pulling of the inserting paper is notified to the inserter controller 700 in step S4b32. Then, the inserting paper in a merge-stand-by state at the registration roller 305 of the inserter 3 is pulled into the horizontal path 340 at an appropriate timing between body text pages. When a discharge completion notification indicating that discharge of inserting paper onto the discharge tray 350 of the inserter 3 is completed is received from the inserter controller 700, the inserting paper feeding sequence is stopped in step S4b33.

Body Text Feeding Determination

Figure 8:
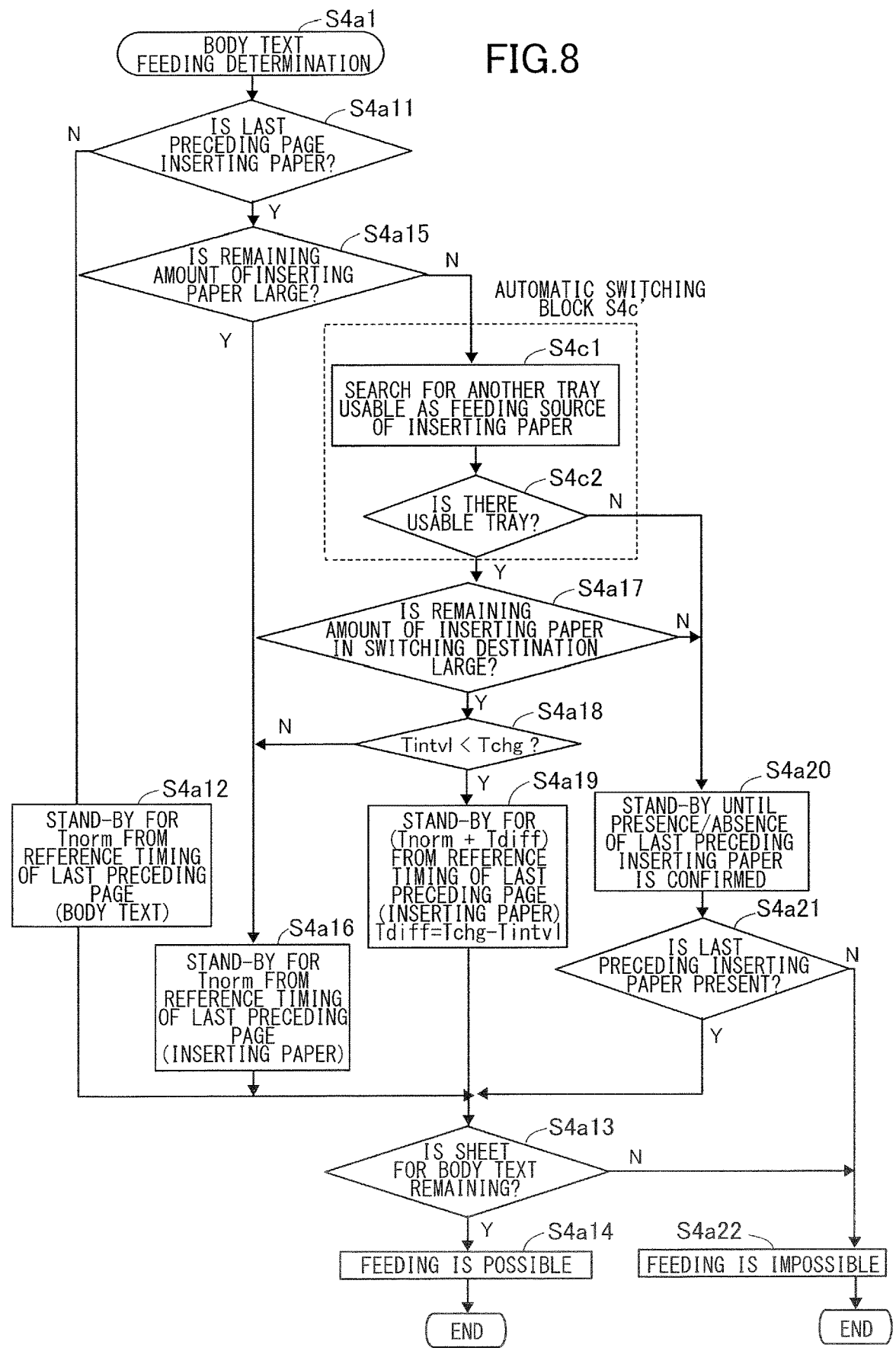
FIG. 8 is a flowchart illustrating body text feeding determination according to the first exemplary embodiment.

FIG. 8 is a flowchart illustrating the body text feeding determination of the page printing sequence, that is, step S4a1 of FIG. 6. Body text feeding determination is processing for determining whether or not the body text feeding sequence can be executed, that is, whether or not the feeding processing of a body text page may be started in the image forming apparatus 1.

In the body text feeding determination, first, whether or not a last preceding page of the target body text page is inserting paper is determined in step S4a11. The target body text page will be also referred to as "current body text". The "last preceding page" refers to a body text page or inserting paper immediately before the current body text in the order of passing through the horizontal path 340 of the inserter 3, and has a positional relationship in which the current body text is subsequent to the last preceding page in the horizontal path 340. In the case where the last preceding page is not inserting paper, that is, in the case where the last preceding page is a body text page, a stand-by state is taken in step S4a12 until a waiting time Tnorm for successive printing of body text elapses from a reference timing of the last preceding. The reference timing in the case where the last preceding page is a body text page is a time point of the start of image formation on the last body text page, that is, a time point of the start of the body text feeding sequence of the last body text page. In addition, the waiting time for successive printing is waiting time from the start of the last body text feeding sequence to the start of the next body text feeding sequence in the case where the image forming apparatus 1 performs image formation on a plurality of sheets at minimum time intervals without insertion of inserting paper. When the waiting time for successive printing has elapsed, whether or not a sheet is present in the storage chamber 220 of the image forming apparatus is checked in step S4a13, determination of "feeding is possible" is made in step S4a14 in the case where there is a sheet, and determination of "feeding is not possible" is made in step S4a22 in the case where there is no sheet.

In step S4a11, in the case where the last preceding page is inserting paper, whether or not the inserting paper remaining amount of the feed tray currently used in the print job being executed in the inserter 3 is large is checked in step S4a15. In the case where the remaining amount of inserting paper is large in step S4a15, a stand-by state is taken in step S4a16 until the predetermined time Tnorm elapses since the start of the image forming operation on the last body text page. After the elapse of the predetermined time, whether or not there is a sheet that can be fed in the storage chamber 220 for body text is checked in step S4a13, determination of "feeding is possible" is made in step S4a14 in the case where there is a sheet, and determination of "feeding is not possible" is made in step S4a22 in the case where there is no sheet. The predetermined time Tnorm will be described later.

The "case where the remaining amount of inserting paper is large" refers to a case where an estimated value of the inserting paper remaining amount obtained by the inserting paper remaining amount obtaining portions 721a and 722a is such a reliable value that shortage of inserting paper does not occur when feeding the inserting paper serving as the last preceding page of the current body text, even in consideration of the number of required sheets of inserting paper and an estimation error. For example, it is assumed that three sheets of inserting paper are required before the current body text reaches the inserter 3, and that it is known that an error of about five sheets can be included in the estimated value of the inserting paper remaining amount. In this case, it can be said that "the remaining amount of inserting paper is large" in the case where the estimated value of the current remaining amount of inserting paper is 20 sheets. However, it cannot be said that the remaining amount of inserting paper is large in the case where the estimated value of the current remaining amount of inserting paper is 7 sheets.

Here, even in the case where it is determined in step S4a15 that the remaining amount of inserting paper is large, there is a possibility that the remaining amount of inserting paper changes in a period from passing the current body text onto the inserter 3 after forming an image thereon in the image forming apparatus to the current body text reaching the merging portion of the horizontal path 340. In other words, presence or absence of particularly inserting paper serving as the last preceding page of the current body text among the inserting paper is not confirmed at the time of step S4a15. Allowing the feeding of the current body text without waiting for confirmation of the presence of the inserting paper serving as the last preceding page of the current body text as described above will be referred to as "pre-presence/absence-detection operation". A feed-before detection mode in the present exemplary embodiment serving as a first mode refers to a state in which the body text feeding sequence is started by the pre-presence/absence-detection operation.

In the case where the remaining amount of inserting paper is not determined as large in step S4a15, that is, in the case where the detection result of the remaining amount detection portion 721 or 722 of the currently selected tray is "small" or "zero", processing of an automatic switching block S4c' is performed. In the automatic switching block S4c', whether or not there is another tray usable in place of the tray currently selected as a feeding source of inserting paper is determined on the basis of the same criterion as in the automatic switching block S4c illustrated in FIG. 6 in the inserting paper feeding block S4b of the page printing sequence. That is, whether or not there is a tray other than the currently selected tray on which inserting paper is supported and whether or not there is a feed tray whose sheet information satisfies a predetermined matching condition with the currently selected tray are checked in step S4c1. In the case where there is a feed tray satisfying both of the two conditions described above, it is determined that there is another tray usable in place of the currently selected tray, that is, the result of step S4c2 is Y. In the case where there is no feed tray satisfying both of the two conditions described above, it is determined that there is no other tray usable in place of the currently selected tray, that is, the result of step S4c2 is N.

To be noted, since this sequence is merely a sequence for determining whether or not the body text feeding sequence can be executed, whether or not the tray serving as the feeding source is switched at the time of the inserting paper serving as the last preceding page is determined in a different processing step even in the case where it is determined in the automatic switching block S4c' that there is another tray that is usable. Specifically, the different processing step is step S4c3 of the page printing sequence illustrated in FIG. 6 or step S69 of an inserting paper feeding preparation process illustrated in FIG. 10A that will be described later. The former corresponds to a case where the printer controller 900 determines switching of the tray and notifies the switching to the inserter controller 700, and the latter corresponds to a case where the inserter controller 700 determines the switching of the tray.

A case where it is determined in step S4c2 that there is no other tray usable in place of the currently selected tray, that is, a case where the result of step S4c2 is N will be described. In this case, the process proceeds to step S4a20, and the determination of whether or not to perform feeding of the current body text is postponed until the presence/absence of inserting paper serving as the last preceding page is confirmed.

Here, confirmation of the presence/absence of inserting paper in a feed tray of the inserter will be described. The inserting paper remaining amount in each feed tray of the inserter 3 at each time point can be obtained by the first remaining amount detection portion 721 and the second remaining amount detection portion 722 described above. However, there is a limit to the accuracy of the remaining amount obtained by the inserting paper remaining amount obtaining portions 721a and 722a, and it is difficult to detect the exact number of remaining sheets. Therefore, it is difficult to accurately determine whether or not inserting paper serving as the last preceding page of the current body text is present in the currently selected tray.

In addition, the inserting paper detection sensors 721b and 722b of the first remaining amount detection portion 721 and the second remaining amount detection portion 722 detect not only inserting paper placed still on trays but also inserting paper being fed, particularly inserting paper in a merge-stand-by state. Therefore, when trying to feed the next sheet of inserting paper after feeding the last sheet of inserting paper from a feed tray, it is necessary to wait for the merge-stand-by state of the last sheet of inserting paper to be cancelled and the last sheet of inserting paper to be pulled into the horizontal path 340 for confirming whether or not the next sheet of inserting paper is present on the tray.

As described above, after the feeding of the last sheet of inserting paper from the currently selected tray is started and before the last sheet of inserting paper is pulled in, the presence/absence of inserting paper is "uncertain" in which the presence/absence of the next sheet of inserting paper in this tray is not confirmed. When the last sheet of inserting paper is pulled into the horizontal path 340, the state of presence/absence of inserting paper becomes "present" in which the presence of the next sheet of inserting paper is confirmed or "absent" in which the absence of the next sheet of inserting paper is confirmed, in accordance with the detection result of the inserting paper detection sensor 721b or 722b. In the description below, three states indicating whether or not inserting paper serving as the last preceding page of the current body text is present will be referred to as "inserting paper: present", "inserting paper: absent", and "inserting paper presence/absence: uncertain" distinguished from the state indicating whether or not inserting paper is currently present on a tray.

Referring back to the flowchart of FIG. 8, in the case where "inserting paper: present" is confirmed by the notification from the inserter controller 700 in step S4a21, that is, in the case where the result of step S4a21 is Y, whether or not there is a sheet that can be fed from the storage chamber 220 of the image forming apparatus 1 is confirmed in step S4a13. Determination of "feeding is possible" is made in step S4a14 in the case where there is a sheet in the storage chamber 220, and determination of "feeding is not possible" is made in step S4a22 in the case where there is no sheet in the storage chamber 220.

In contrast, in the case where "inserting paper: absent" is confirmed in step S4a21, determination of "feeding is not possible" is made for the current body text. This is because, even if the current body text is fed, the inserting paper cannot be inserted immediately before the current body text, and therefore the print job is stopped and the body text page and inserting paper being processed remain in the apparatus. Even if the body text page is forcibly discharged without inserting the inserting paper, the page order of the product becomes different from the order designated in the job.

As described above, determining whether or not to perform the body text feeding sequence after confirming the presence/absence of the inserting paper serving as the last preceding page will be referred to as "post-presence/absence-detection operation". A feed-after-detection mode in the present exemplary embodiment serving as a second mode refers to a state in which the body text feeding sequence is started by the post-presence/absence-detection operation. In the post-presence/absence-detection operation, the start of the body text feeding sequence on a body text page whose last preceding page is inserting paper is delayed until the presence/absence of the last preceding page is confirmed, and therefore the post-presence/absence-detection operation has lower productivity than the pre-presence/absence-detection operation. On the other hand, in the post-presence/absence-detection operation, since the body text feeding operation is started after confirming the presence of inserting paper serving as the last preceding page, the print job is not stopped due to exhaustion of inserting paper unless inserting paper is removed from the feed tray after the start of the sequence.

Incidentally, the inserter 3 of the present exemplary embodiment includes a plurality of feed trays 320 and 321, and there is a possibility that, even in the case where the remaining amount of inserting paper in the tray currently selected as the feeding source of inserting paper is small or zero, usable inserting paper is present in another tray. Therefore, the present exemplary embodiment is configured such that the print job can be continued while feeding the body text page by the pre-presence/absence-detection operation in the case where another tray usable as the feeding source of the inserting paper has been found, that is, in the case where the result of step S4c2 is Y.

Specifically, in the case where it is determined in step S4a17 that the inserting paper remaining amount of the tray to which the switching is performed is large, whether or not feeding of the body text page is possible is determined when a predetermined time has elapsed from the reference timing of the inserting paper serving as the last preceding page, without waiting for confirmation of the presence/absence of the inserting paper serving as the last preceding page. This corresponds to steps S4a18, S4a16, and S4a19. The reference timing in the case where the last preceding page is inserting paper refers to a time point at which image formation for the last preceding page is started in the case where the last preceding page is replaced by a body text page. In the case where further the last preceding page of the last preceding page is a body text page, the reference timing in the case where the last preceding page is inserting paper is a time point at which the waiting time Tnorm for successive printing has elapsed since the reference timing of the previous body text page. The predetermined time corresponding to Tnorm or Tnorm+Tdiff will be described later.

In the case where it has not been determined in step S4a17 that the remaining amount of inserting paper in the tray to which switching has been performed is large, the process transitions to post-presence/absence-detection operation similarly to the case where another tray from which the inserting paper can be fed has not been found in the automatic switching block S4c'. In addition, in the case where automatic switching is set to OFF in the setting screen of FIG. 4B and the remaining amount of inserting paper is small in step S4a15, the process skips the automatic switching block S4c', proceeds to step S4a20, and transitions to the post-presence/absence-detection operation.

As described above, in the present exemplary embodiment, the pre-presence/absence-detection operation can be performed when executing a print job of feeding inserting paper from the inserter 3 and inserting the inserting paper between body text pages. Further, in the case where it is known that there is a sheet in a feed tray different from the feed tray selected as the feeding source of the inserting paper, the pre-presence/absence-detection operation can be continued. In other words, the image forming system of the present exemplary embodiment is configured to be capable of executing a feed-before-detection mode serving as a first mode when executing a job. In the feed-before-detection mode, a feeding process of a recording sheet is started before a detection portion detects whether or not an inserting sheet that can be inserted immediately before the recording sheet is present on a supporting portion selected as a feeding source of the inserting sheet among a plurality of supporting portions. Further, in the case where a first supporting portion is selected as the feeding source of the inserting sheet among the plurality of supporting portions and the detection portion has detected that the inserting sheet is supported on a second supporting portion different from the first supporting portion, the feeding process of the recording sheet is started in the feed-before-detection mode.

According to this configuration, the feeding process can be performed in the feed-before-detection mode even in the case where conventionally it has not been possible to perform the feeding process in the feed-before-detection mode such as a case where the remaining amount of sheets on the supporting portion selected as the feeding portion of the inserting sheet is small. In this case, by checking whether the inserting sheet is present on a supporting portion different from the supporting portion selected as the feeding source of the inserting sheet, the possibility that the job is stopped due to exhaustion of the inserting sheet can be reduced. That is, in a configuration in which the feeding process is always performed in the feed-before-detection mode and whether or not the inserting sheet is present on a different supporting portion is checked after the start of the feeding process, the job is stopped in the case where there is no sheet on the different supporting portion. According to the configuration of the present exemplary embodiment, the feeding process is executed in the feed-before-detection mode as long as possible while avoiding such stoppage of the job, and therefore the productivity of the image forming system can be improved.

Sheet Interval Control in Consideration of Switching of Tray

Next, control of the conveyance interval between body text pages and inserting paper when automatic switching of the feed tray is performed in the inserter 3 will be described. The conveyance interval will be referred to as "sheet interval". The sheet interval described below refers to, specifically, a time interval between leading ends of sheets passing through the merging portion P1 of the horizontal path 340 illustrated in FIG. 1 where the conveyance path of the body text page and the conveyance path of the inserting paper merge. The merging portion P1 serves as a predetermined position of the present exemplary embodiment.

Figure 9A:
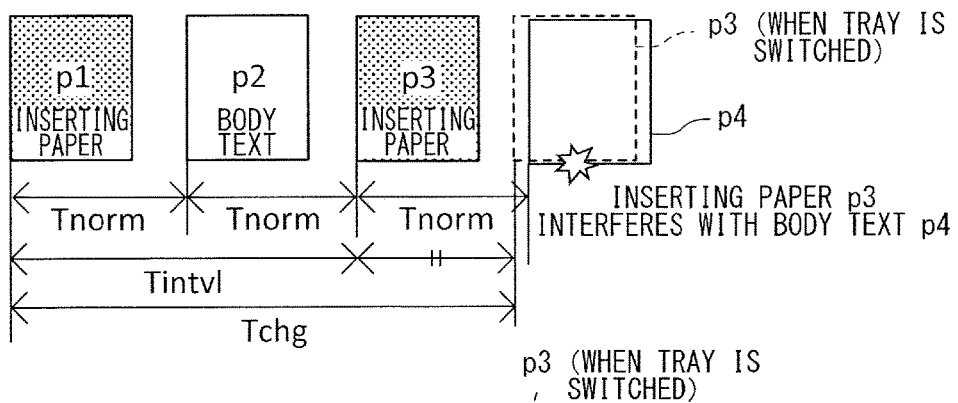
FIGS. 9A to 9D are concept diagrams for describing conveyance intervals between sheets.
Figure 9B:
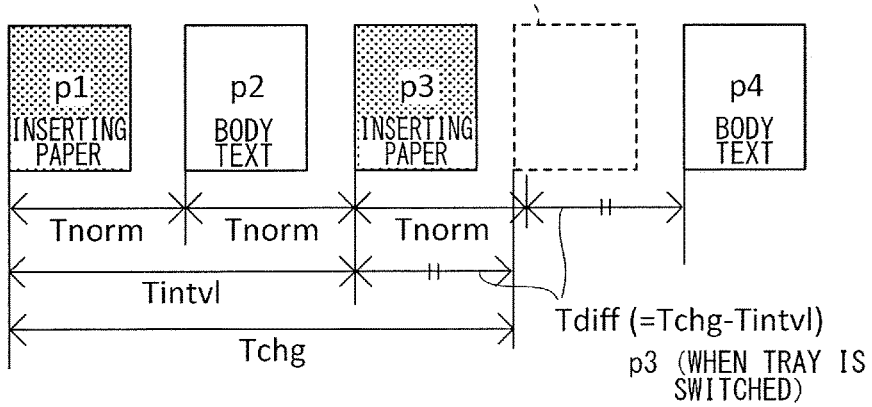

FIGS. 9A and 9B are conceptual diagrams illustrating the sheet intervals between body text pages and inserting paper at the merging portion. FIG. 9A illustrates sheet intervals of a reference example, and FIG. 9B illustrates sheet intervals of the present exemplary embodiment. Here, a case where inserting paper p1, body text p2, inserting paper p3, and body text p4 are sequentially conveyed is illustrated as an example, and the inserting paper p1 and p3 are fed from the first feed tray 320. In addition, it is assumed that the first feed tray 320 is in a state in which it is determined that the inserting paper remaining amount therein is large at the time when the body text feeding determination of the body text p2 is performed, and the state changes to a state in which it is determined that the inserting paper remaining amount therein is small, when the inserting paper p1 is pulled into the horizontal path 340.

Since the remaining amount of inserting paper is still large when feeding of the body text p2 is started, the body text p2 is fed by the pre-presence/absence-detection operation, that is, the result of step S4a15 of FIG. 8 is Y. A sheet interval normally used in the pre-presence/absence-detection operation is referred to as a normal sheet interval Tnorm. The value of the normal sheet interval Tnorm is set such that a productivity as high as possible can be achieved without the inserting paper and the body text colliding with each other at the merging portion in the case where it is known that automatic switching of feed tray is to be not performed in the inserter 3. That is, when the body text feeding sequence of the body text p2 is started, since it is clear that the remaining amount of inserting paper is large and automatic switching of the tray in the inserter 3 does not occur, the normal sheet interval Tnorm in which the productivity is prioritized is used.

To be noted, the normal sheet interval Tnorm in the present exemplary embodiment is equal to the waiting time for successive printing of body text pages in step S4a12 of FIG. 8. In other words, when a sufficient amount of inserting paper is present on the tray currently selected as the feeding source of the inserting paper, sheets pass through the merging portion P1 of the horizontal path 340 at a constant interval regardless of the passing order of the inserting paper and body text pages.

In contrast, when the inserting paper p1 is fed, the inserting paper remaining amount of the first feed tray 320 becomes small, and there arises a possibility that automatic switching of the tray is to be performed in the inserter 3. That is, in the example illustrated in FIG. 9A, at the time when the feeding determination of the body text p4 is performed, there is still a possibility that the tray is switched in a period between the inserting paper p1 and the inserting paper p3. When the sheet interval between the inserting paper p1 and the inserting paper p3 in the case where the feed tray is not switched is Tintvl, if switching is performed in the period between the inserting paper p1 and the inserting paper p3, a time Tchg longer than Tintvl may be required. Tintvl is a sheet interval between sheets of inserting paper in the case where the switching of the tray is not performed, and depends on the order of insertion of the inserting paper designated in the print job, that is, the number of body text pages between the sheets of inserting paper.

If switching of the tray does not occur in the period between the inserting paper p1 and the inserting paper p3, no problem occurs when the pre-presence/absence-detection operation of the body text p4 at the normal sheet interval Tnorm as in a comparative example. However, in the case where the switching of the tray is performed in the period between the inserting paper p1 and the inserting paper p3 after the start of the feeding sequence of the body text p4, there is a possibility that the feeding of the inserting paper p3 does not keep up with the body text p4 reaching the inserter 3, that is, the timing of the body text p4 reaching the inserter 3 may be earlier than it should be with respect to the inserting paper p3. In this case, to avoid inconvenience caused by interference between sheets, such as collision or overlap, it is determined that jam has occurred, and the print job is stopped. Therefore, in the case where there is a possibility that the switching of the feed tray is performed before the body text page to be fed this time reaches the inserter 3, the feeding sequence of the body text page needs to be started while securing the time Tchg required for the switching.

Here, in the body text feeding determination of the present exemplary embodiment, in the case where the pre-presence/absence-detection operation is performed on the basis of the fact that there is another tray to which the currently selected tray can be switched as illustrated in FIG. 8, that is, in the case where the result of step S4a17 is Y, Tchg and Tintvl are compared with each other in step S4a18. In the case where Tchg is larger than Tintvl, that is, in the case where the result of step S4a18 is Y, processing for securing a sheet interval required for switching the tray is performed. That is, in the case where the conveyance interval Tintvl between sheets of inserting paper obtained on the basis of the order of pages designated in the job is smaller than the predetermined length Tchg, processing for securing a sheet interval required for switching of the tray is performed.

Specifically, the time Tdiff obtained by subtracting Tintvl from Tchg is added to the normal sheet interval Tnorm of the pre-presence/absence-detection operation in step S4a19 of FIG. 8. As illustrated in FIG. 9B, the sheet interval between the inserting paper p3 and the body text p4 is calculated by Tnorm+(Tchg−Tintvl). In other words, in the case where there is a possibility that switching of the tray serving as the feeding source of the inserting paper is to be performed, the start of the feeding sequence with respect to the current body text is delayed by Tdiff with respect to the case where it is known that switching of the tray is not to be performed. As a result of this, occurrence of jam caused by interference between the inserting paper p3 and the body text p4 can be prevented even in the case where the tray is switched in the period between the inserting paper p1 and the inserting paper p3.

Figure 9C:
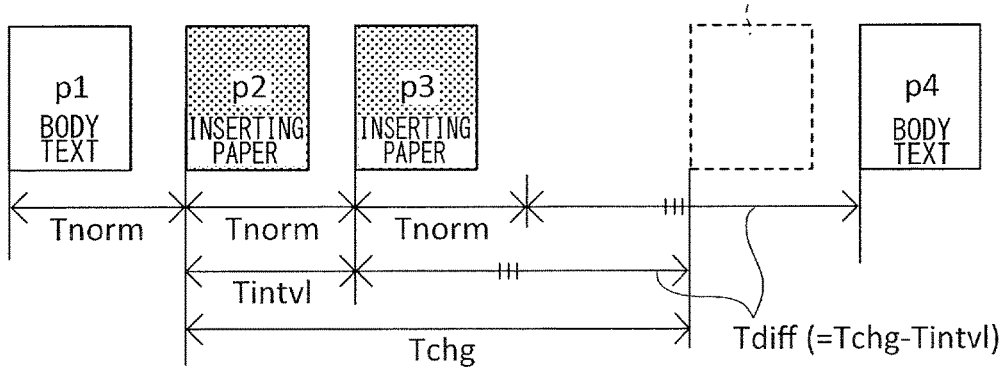

As illustrated in FIG. 9C, a page order in which a plurality of sheets of inserting paper are successively inserted before the current body text p4 can be also considered. In this case, the sheet interval between the inserting paper p3 immediately before the body text p4 and the inserting paper p2 before the inserting paper p3 becomes short, and as a result, Tdiff, which is the difference between Tintvl and Tchg becomes large. Therefore, in this case, the start of the feeding sequence of the body text p4 is further delayed with respect to the example illustrated in FIG. 9B.

Figure 9D:
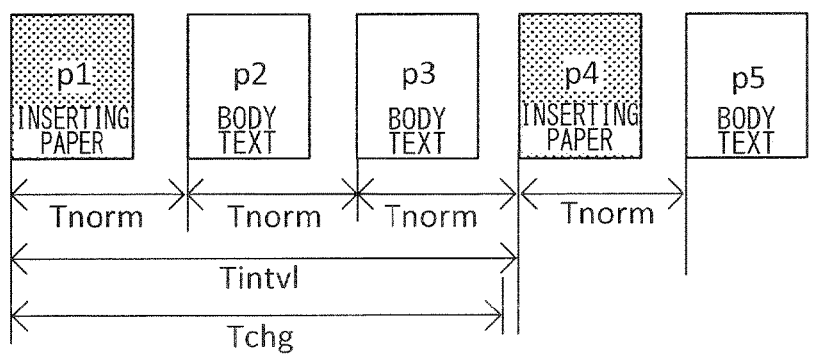

In contrast, in the case where Tchg is equal to or smaller than Tintvl in step S4a18, that is, in the case where the sheet interval between sheets of inserting paper is equal to or longer than a predetermined length, jam does not occur even when the automatic switching of the feed tray is performed for the inserting paper serving as the last preceding page of the current body text. For example, in the case of the page order in which a plurality of body text pages are present between sheets of inserting paper as illustrated in FIG. 9D, there is a tendency that a relationship of Tintvl≥Tchg is satisfied. In this case, the feeding of the inserting paper p4 is performed in time even if body text p5 is fed in the normal sheet interval Tnorm with respect to the inserting paper p4 and the automatic switching of the feed tray is performed in a period between the inserting paper p1 and the inserting paper p4. Therefore, in the case where the relationship of Tintvl≥Tchg is satisfied, the start of the feeding sequence of the current body text does not have to be delayed, and the normal sheet interval Tnorm of the pre-presence/absence-detection operation is applied to the inserting paper serving as the last preceding page in step S4a16.

As reasons why the time Tchg required in the case where the switching of the feed tray is performed is longer than the sheet interval Tintvl of the case where the switching is not performed, the following can be mentioned. First, to feed inserting paper from a feed tray that is currently not used, a period for preparation operation is required. The preparation operation includes, for example, lifting the lift plate of the feed tray by the lift motor 714 or 716 illustrated in FIG. 3 to bring the uppermost sheet of inserting paper into contact with the feed roller 303 or 306. In the case where the preparation operation of the feed tray to which the switching is to be performed is started after confirming that no sheet is present in the currently selected tray, the feeding of the inserting paper cannot be started until the preparation operation is completed, and therefore Tchg becomes longer. In the case where the conveyance path length of the inserting paper from the feed tray to which the switching has been performed to the merging portion of the horizontal path 340 is longer than the conveyance path length from the currently selected tray to the merging portion, Tchg becomes even longer.

In addition, although description has been given in the present exemplary embodiment assuming that two drive sources, which are the feed motors 713 and 715 respectively driving the feed rollers 303 and 306 of the respective feed trays, are provided, a plurality of feed rollers may be driven by a single drive source. For example, the second feed motor 715 is omitted by drivably coupling the second feed roller 306 to the first feed motor 713, and a clutch mechanism is disposed in a drive transmission path from the first feed motor 713 to the feed rollers 303 and 306 such that arbitrary driving roller can be driven. In such a configuration, waiting time is required for switching from a state in which one feed roller is coupled to the drive source to a state in which the other feed roller is coupled to the drive source, and therefore Tchg becomes longer.

As described above, in the present exemplary embodiment, the start of the feeding sequence of the current body text is delayed in accordance with the remaining amount of inserting paper in the tray serving as feeding source in a configuration in which the tray serving as the feeding source of the inserting paper is switchable. That is, the feeding sequence of the current body text is started at a predetermined timing in a state in which a first amount of inserting paper is supported on the tray, and the start of the feeding sequence of the current body text is delayed with respect to the predetermined timing in a state in which inserting paper of a second amount smaller than the first amount is supported on the tray. The "predetermined timing" is a timing for executing the feeding process of a body text page without switching the tray for higher productivity, and in the case of the present exemplary embodiment, the predetermined timing is defined such that the inserting paper and the body text pages pass through the merging portion P1 at constant intervals, whose value is Tnorm.

By delaying the start of the feeding sequence of the current body text, the sheet interval between the current body text and inserting paper fed before the inserting paper serving as the last preceding page of the current body text, that is, the sheet interval between the inserting paper p1 and the body text p4 of FIG. 9B or the sheet interval between the inserting paper p2 and the body text p4 of FIG. 9C, is secured. In other words, the interval between a time when an inserting sheet fed from a second feeding portion before an inserting sheet (preceding insert sheet) preceding the current recording sheet passes a predetermined position in the sheet conveyance path to a time when the current recording sheet passes the predetermined position is secured. As a result of this, the print job can be continued without stopping the conveyance of the current body text even in the case where the feeding of the inserting paper serving as the last preceding page is delayed by switching the tray serving as the feeding source of the inserting paper after the start of the feeding sequence of the current body text.

To be noted, as long as the conveyance interval between the current body text and the inserting paper fed before the inserting paper serving as the last preceding page of the current body text is secured, the feeding timing of the inserting paper serving as the last preceding page can be changed within a period from time when the remaining amount of inserting paper in the currently selected tray becomes small and a time when the tray is switched. That is, in a state in which the start of the feeding sequence of the body text p4 is delayed as illustrated in FIGS. 9B and 9C, the inserting paper p3 may be conveyed at a timing indicated by a broken line regardless of whether or not switching of the tray is performed in the period between the inserting paper p3 and inserting paper preceding the inserting paper p3. In this case, for example, when the remaining amount of inserting paper in the currently selected tray is small in the inserting paper feeding block illustrated in FIG. 6, inserting a process of taking a stand-by state for the time Tdiff described above before performing notification of inserting paper feeding preparation in step S4b2 can be considered.

Control of Inserter

Figure 10A:
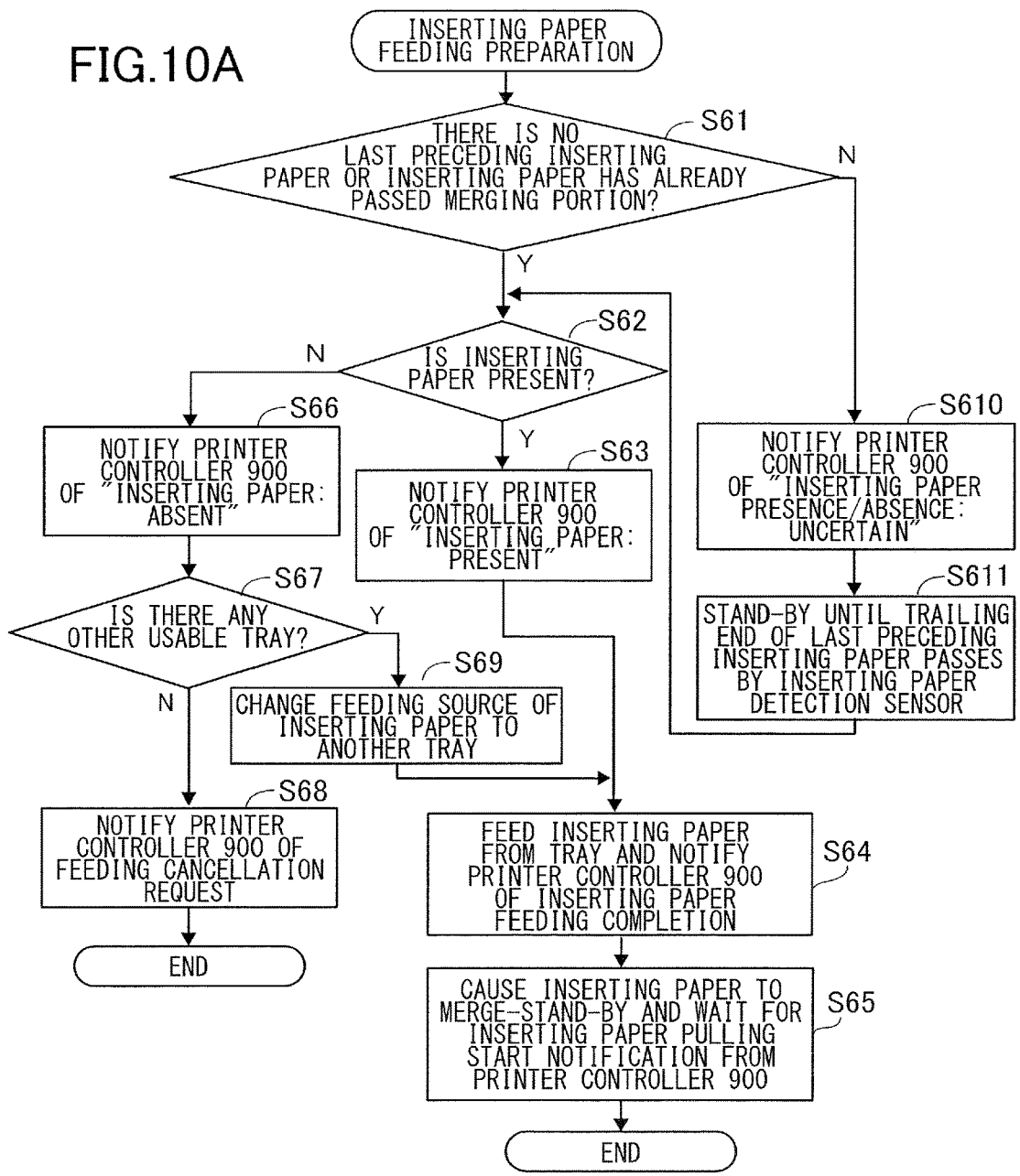
FIG. 10A is a flowchart illustrating processing performed in the case where the inserter according to the first exemplary embodiment has received notification of inserting paper feeding preparation.
Figure 10B:
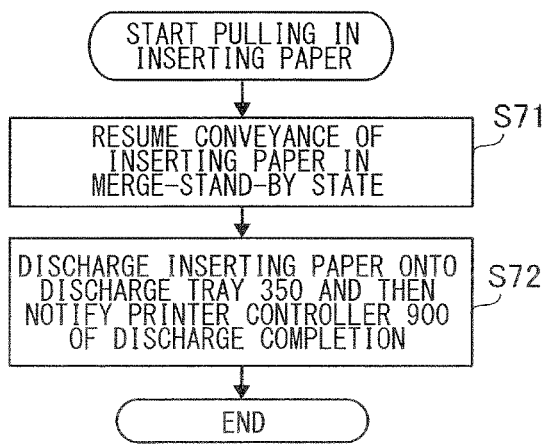
FIG. 10B is a flowchart illustrating processing performed in the case where the inserter according to the first exemplary embodiment has received notification of start of pulling of inserting paper.

FIGS. 10A and 10B are flowcharts illustrating control performed by the inserter controller 700. Processing of these flowcharts is performed by the CPU 701 reading out and executing a control program describing processing of each step.

FIG. 10A is a flowchart illustrating control performed by the inserter controller 700 when receiving the notification of inserting paper feeding preparation from the printer controller 900. When the notification of inserting paper feeding preparation is received, the inserter controller 700 performs processing for checking presence/absence of inserting paper in a tray designated by the notification received from the printer controller 900. This processing corresponds to steps S61, S62, S610, and S611.

First, whether or not there is no last preceding inserting paper, that is, whether or not the notification of feeding preparation has been received for the first time in the executed print job, or the last preceding inserting paper has been already conveyed to a position where the trailing end of the inserting paper is not detected by the inserting paper detection sensor is checked in step S61. In the case where the result of step S61 is N, notification of "inserting paper presence/absence: uncertain" for the designated feed tray is transmitted to the printer controller 900 in step S610, and a stand-by state is taken in step S611 until the presence/absence of the inserting paper is confirmed, that is, until the trailing end of the last preceding inserting paper passes the detection position of the inserting paper detection sensor. In the case where the result of step S61 is Y, since the presence/absence of inserting paper can be confirmed by the detection results of the inserting paper detection sensors 721b and 722b of the remaining amount detection portions, the presence/absence of inserting paper in the designated tray is determined in step S62. In the case where the presence of inserting paper is detected, notification indicating that the state of the designated feed tray is confirmed as "inserting paper: present" is transmitted to the printer controller 900 in step S63. Then, inserting paper is fed from the designated feed tray, and an inserting paper feeding completion notification is transmitted to the printer controller 900 in step S64. Further, in a state in which the inserting paper is caused to merge-stand-by, inserting paper pulling start notification from the printer controller 900 is waited for in step S65.

In the case where the remaining amount detection portion has not detected the inserting paper in step S62, notification indicating that the state of the designated feed tray is confirmed as "inserting paper: absent" is transmitted to the printer controller 900 in step S66. Then, in step S67, whether or not there is a tray usable as a feeding source of the inserting paper other than the designated feed tray is checked in step S67 on the basis of the detection results of the first remaining amount detection portion 721 and the second remaining amount detection portion 722. Similarly to the blocks S4c and S4c' of automatic switching described above illustrated in FIGS. 6 and 8, the criterion for the "other tray usable as a feeding source of inserting paper" is that at least one sheet of inserting paper is supported on the tray and the sheet information thereof satisfies a predetermined matching condition with the sheet information of the designated tray.

In the case where there is no other usable tray, that is, in the case where the result of step S67 is N, since feeding of inserting paper of this time cannot be performed, the printer controller 900 is notified of a request for feeding cancellation in step S68, and processing is finished. The printer controller 900 having received the feeding cancellation request stops the page printing sequence on the current sheet of inserting paper time and sheets after the current sheet of inserting paper, and the print job is stopped.

In the case where another tray usable as the feeding source of inserting paper has been found in step S67, that is, in the case where the result of step S67 is Y, the feeding source of inserting paper is changed to the found feed tray in step S69, and the process proceeds to step S64 to perform feeding operation of inserting paper. As described above, by switching the tray serving as the feeding source of inserting paper by the inserter controller 700, execution of the print job can be continued without cancelling feeding of the inserting paper even in the case where there is no inserting paper in the feed tray designated by the printer controller 900. For example, in the case where the state is "inserting paper presence/absence: uncertain" when determining whether or not sheet is absent in the currently selected tray in the page printing sequence illustrated in FIG. 6, that is, in the case where the presence/absence of inserting paper is uncertain in step S4b1, the printer controller 900 designates the currently selected tray and issues the notification of inserting paper feeding preparation in step S4b2. In this case, even if the state of the currently selected tray changes from "inserting paper presence/absence: uncertain" to confirmation of "inserting paper: absent" after the notification of the inserting paper feeding preparation, the inserter controller 700 autonomously searches for a substitutable tray to execute the feeding of inserting paper.

FIG. 10B is a flowchart illustrating control performed by the inserter controller 700 when the start of pulling of inserting paper indicated by S4b33 of FIG. 7B or the like is notified by the printer controller 900.

When the notification of start of pulling of inserting paper is received, the conveyance of the inserting paper in the merge-stand-by state is resumed in step S71, the inserting paper is pulled into the horizontal path 340, and the inserting paper is discharged onto the discharge tray 350 by the discharge roller 302. Then, when it is confirmed by the discharge sensor 312 that the inserting paper has been discharged onto the discharge tray 350, the printer controller 900 is notified of discharge completion in step S72.

Operation Example

Figure 11:
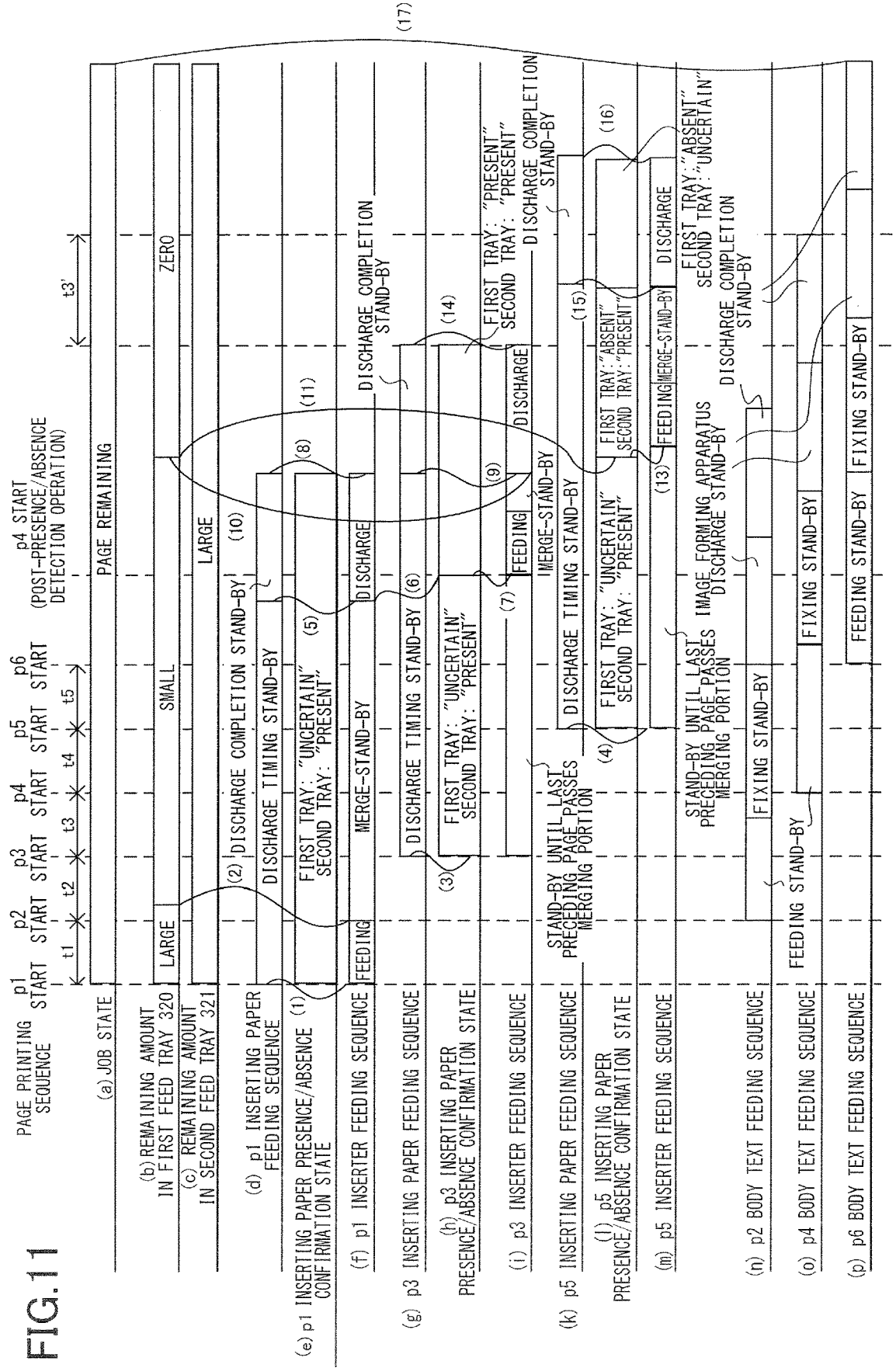
FIG. 11 is a timing chart illustrating an operation example of the image forming system according to the first exemplary embodiment.

FIG. 11 is a timing chart illustrating an operation example of a print job in the image forming system of the present exemplary embodiment. Here, the description will be given by taking a job in which inserting paper and body text pages are alternately conveyed in the order of inserting paper/body text/inserting paper/body text/inserting paper/body text as an example. These pages are assigned with page numbers of p1 to p6. The operation of the image forming system of the present exemplary embodiment will be described below with reference to the flowcharts of FIGS. 5, 6, 7A, 7B, 10A, and 10B. To be noted, parenthesized numbers in the figures indicate the order of occurrence of events in this operation example.

In FIG. 11, (a) indicates a job state. The job state is a state of whether or not there is a page whose printing is yet to be performed in the flowchart of FIG. 5. The job state becomes "page remaining" at the start of the print job and, at (17) the end of the body text feeding sequence of the page p6 serving as the final page, the job state becomes "no page" and the print job is finished. This corresponds to step S5 in FIG. 5. Since the page printing sequence is started at predetermined time intervals when the print job is received, the start intervals of the page printing sequence of the pages p1 to p6 are set as t1 to t5 herein.

In FIG. 11, (b) indicates the remaining amount of inserting paper in the first feed tray 320. In this example, the remaining amount is large at the start of the print job, (2) the remaining amount becomes small when the inserting paper p1 is fed, and (10) the remaining amount becomes zero when the inserting paper p3 is fed, and (c) indicates the remaining amount of inserting paper in the second feed tray 321. In this example, the remaining amount is large in the period from the start to the end of the print job, and inserting paper of the same type and size as in the first feed tray 320 is supported on the second feed tray 321. In addition, sheets of a sufficient amount are accommodated in the storage chamber 220.

In FIG. 11, (d) to (m) respectively indicate the state of the feeding sequence, the inserting paper presence/absence confirmation state, and the state of the inserter feeding sequence of the inserting paper p1 to p3. In addition, (n) to (p) indicate the body text feeding sequence of the body texts p2, p4, and p6 illustrated in FIG. 7A. Among these, the inserter feeding sequence illustrated in FIGS. 10A and 10B is executed by the inserter controller 700, and the inserting paper feeding sequence and the body text feeding sequence illustrated in FIGS. 7A and 7B are executed by the printer controller 900. The inserting paper presence/absence confirmation state indicates which of "inserting paper: present", "inserting paper: absent, and "inserting paper presence/absence: uncertain" the state of the tray corresponds to. In "inserting paper: present", it is confirmed that a sheet that can be fed as the inserting paper is present on the tray. In "inserting paper: absent", it is confirmed that a sheet that can be fed as the inserting paper is not present on the tray. In "inserting paper presence/absence: uncertain", it is uncertain whether or not there is a sheet that can be fed as the inserting paper on the tray.

(d) Feeding Sequence of Inserting Paper p1

First, when the page printing sequence of the inserting paper p1 is started, the first feed tray 320 is designated in the inserter controller 700, (1) the inserting paper feeding preparation is notified, and (d) an inserting paper feeding sequence and (f) an inserter feeding sequence are started. These correspond to N in step S4b1 and to steps S4b2 and S4b3 in FIG. 6. Since there is no inserting paper preceding the inserting paper p1, (e) the inserting paper presence/absence confirmation state of the inserting paper p1 is immediately confirmed as "inserting paper: present". Therefore, the inserter controller 700 notified of the inserting paper feeding preparation of the inserting paper p1 feeds the inserting paper p1 and causes the inserting paper p1 to (2) merge-stand-by. These correspond to steps S61 to S65 in FIG. 10A.

The printer controller 900 waits for a time corresponding to a time required for reaching the discharge sensor 152 by the inserting paper feeding sequence from the start of image formation of the body text, and notifies the inserter controller 700 of (5) start of pulling of the inserting paper. These correspond to steps S4b31 and S4b32 in FIG. 7B. Then, the inserter controller 700 resumes conveyance of the inserting paper p1 having been caused to merge-stand-by, and transmits discharge completion notification of the inserting paper p1 to the printer controller 900. These correspond to steps S71 and S72 in FIG. 10B. The printer controller 900 receives the discharge completion notification (8) from the inserter controller 700, and the inserting paper feeding sequence of the inserting paper p1 is finished in step S4b33 of FIG. 7B.

(n) Feeding Sequence of Body Text p2

The page printing sequence of the body text p2 is started after the elapse of t1 from the start of sequence of the inserting paper p1. In the body text feeding determination in step S4a1 of FIG. 6 illustrated in FIG. 8, the remaining amount of inserting paper in the first feed tray 320, which is the currently selected tray, is determined to be large, that is, the result of step S4a15 of FIG. 8 is Y. Therefore, the result of the body text determination is "feeding is possible" in step S4a14 of FIG. 8, and immediately the body text feeding sequence is started in step S4a3 of FIG. 6.

In the body text feeding sequence, first, formation of an image to be transferred onto the body text p2 is started in step S4a31 of FIG. 7A, and a state of "feeding stand-by" in which a stand-by state is taken for a predetermined time until the start of feeding of the sheet is taken in step S4a32 of FIG. 7A. Next, when the sheet serving as the body text p2 is fed from the storage chamber 220 in step S4a33 of FIG. 7A, a state of "fixing stand-by" in which a stand-by state is taken for a predetermined time until the start of a fixing process is taken in step S4a34 of FIG. 7A. Then, when the fixing process is started, a state of "body discharge stand-by" in which a stand-by state is taken until the leading end of the body text p2 reaches the discharge sensor 152 of the image forming apparatus 1 is taken in step S4a35 of FIG. 7A. Then, when the body text p2 is passed onto the inserter 3 from the image forming apparatus 1, a state of "discharge completion stand-by" in which a stand-by state is taken until a discharge completion notification is received from the inserter 3 is taken in step S4a37 of FIG. 7A, and the feeding sequence of the body text p2 is finished by reception of the discharge completion notification.

(g) Feeding Sequence of Inserting Paper p3

The page printing sequence of the inserting paper p3 is started after the elapse of t2 from the start of sequence of the body text p2. Since the state of the first feed tray 320 is not "inserting paper: absent" at this time, that is, since the result of step S4b1 of FIG. 6 is N, similarly to the page printing sequence of the inserting paper p1, the first feed tray 320 is designated in the inserter controller 700, and (3) the inserting paper feeding preparation is notified. In addition, (g) the inserting paper feeding sequence and (i) the inserter feeding sequence are started. These correspond to steps S4b2 and S4b3 in FIG. 6. Since the preceding inserting paper p1 is present on the first conveyance path and the presence/absence of the inserting paper p3 is not confirmed from the detection result of the first remaining amount detection portion 721, (h) the inserting paper presence/absence state of the inserting paper p3 is "uncertain". These correspond to steps S61 and S610 in FIG. 10A.

When (15) the merge-stand-by state of the inserting paper p1 preceding the inserting paper p3 is cancelled by the start of pulling of the inserting paper and the conveyance of the inserting paper p1 is resumed, it becomes possible to confirm the presence/absence of the inserting paper p3. That is, when the trailing end of the inserting paper p1 passes the detection position of the inserting paper detection sensor of the first remaining amount detection portion 721, (6) "inserting paper: present" of the first feed tray 320 is confirmed for the inserting paper p3. These correspond to steps S611 and S62 in FIG. 10A. Then, the inserter controller 700 (7) starts feeding the inserting paper p3 and causes the inserting paper p3 to merge-stand-by. These correspond to steps S63, S64, and S65 in FIG. 10A.

The printer controller 900 waits for a time corresponding to a time required for reaching the discharge sensor 152 by the inserting paper feeding sequence from the start of image formation of the body text, and (9) notifies the inserter controller 700 of start of pulling of the inserting paper. These correspond to steps S4b31 and S4b32 in FIG. 7B. The inserter controller 700 resumes conveyance of the inserting paper p3 having been caused to merge-stand-by, and transmits discharge completion notification of the inserting paper p3 to the printer controller 900. These correspond to steps S71 and S72 in FIG. 10B. The printer controller 900 (14) receives the discharge completion notification from the inserter controller 700, and the inserting paper feeding sequence of the inserting paper p3 is finished in step S4b33 of FIG. 7B.

(o) Feeding Sequence of Body Text p4

The page printing sequence of the body text p4 is started after the elapse of t3 from the start of sequence of the inserting paper p3. At this time, in the body text determination of step S4a1 of FIG. 6, since the remaining amount of inserting paper in the first feed tray 320, which is the currently selected tray, is small, that is, since the result of step S4a15 of FIG. 8 is N, another tray usable as the feeding source of inserting paper is searched for in step S4c1 of FIG. 8. In this example, the second feed tray 321 usable in place of the currently selected tray is found and the remaining amount of inserting paper in the second feed tray 321 is large, and therefore feeding of the body text p4 is "possible". These correspond to step S4a14 and Y of step S4a17 in FIG. 8. At this time, whether or not the last preceding inserting paper p3 is present in the first feed tray 320 is uncertain, and the body text feeding sequence of the body text p4 is started by the pre-presence/absence-detection operation.

At this time, since there is a possibility that switching of the tray occurs in a period between the inserting paper p1 and the inserting paper p3, processing of delaying the start of the body text feeding sequence of the body text p4 is performed. In this example, the sheet interval Tintvl between the inserting paper p1 and the inserting paper p3 is shorter than the time Tchg required for switching of the tray, and therefore Tdiff is waited for from the last image formation in addition to the sheet interval required for the pre-presence/absence-detection operation. These correspond to step S4a19 and Y of step S4a18 in FIG. 8. Then, when it is determined that feeding of the body text p4 is "possible" in step S4a14 of FIG. 8, the body text feeding sequence is immediately started in step S4a3 of FIG. 6.

That is, the "feeding stand-by" of the feeding sequence of the body text p4 of FIG. 11 is different from the feeding sequence of the body text p2 in that the body text feeding determination includes the waiting time Tdiff for delaying the start of the feeding sequence. The progress of the body text feeding sequence after determination of "feeding is possible" is made in the body text feeding determination is similar to that of the body text p2.

(k) Feeding Sequence of Inserting Paper p5

The page printing sequence of the inserting paper p5 is started after the elapse of t4 from the start of sequence of the body text p4. Similarly to the page printing sequence of the inserting paper p3, the state of the first feed tray 320 is not confirmed as "inserting paper: absent" at this time, that is, the result of step S4b1 of FIG. 6 is N. Therefore, the printer controller 900 designates the first feed tray 320 and (4) notifies the inserting paper feeding preparation to the inserter controller 700, and (k) the inserting paper feeding sequence and (m) the inserter feeding sequence are started. These correspond to steps S4b2 and S4b3 in FIG. 6.

Since the preceding inserting paper p3 is present on the first conveyance path when the inserter controller 700 receives the notification of the inserting paper feeding preparation, (1) the inserting paper presence/absence confirmation state of the inserting paper p5 is "uncertain". These correspond to step S610 and N of step S61 in FIG. 10A. (9) When the merge-stand-by of the inserting paper p3 is cancelled by the notification of start of pulling of inserting paper and the conveyance of the inserting paper p3 is resumed and when (10) the trailing end of the inserting paper p3 passes by the inserting paper detection sensor 721b, no inserting paper remains on the first feed tray 320. In this case, on the basis of change in the signal output from the inserting paper detection sensor 721b, (11) "inserting paper: absent" of the first feed tray 320 is confirmed for the inserting paper p5. These correspond to steps S611, S62, and S66 in FIG. 10A.

The inserter controller 700 finds the second feed tray 321 as a tray usable in place of the first feed tray 320. Then, after switching the feeding source of inserting paper to the second feed tray 321, (13) feeds the inserting paper p5 and causes the inserting paper p5 to merge-stand-by. These correspond to steps S69, S64, and S65 in FIG. 10A. The printer controller 900 continues the inserting paper feeding sequence, and after waiting for a time corresponding to a time required for reaching the discharge sensor 152 by the inserting paper feeding sequence from the start of image formation of the body text, (15) notifies the inserter controller 700 of start of pulling of the inserting paper. These correspond to steps S4b31 and S4b32 in FIG. 7B. The inserter controller 700 resumes conveyance of the inserting paper p5 having been caused to merge-stand-by, and transmits discharge completion notification of the inserting paper p5 to the printer controller 900 when the inserting paper p5 is completely pulled in and discharged. These correspond to steps S71 and S72 in FIG. 10B. The printer controller 900 (16) receives the discharge completion notification from the inserter controller 700, and the inserting paper feeding sequence of the inserting paper p5 is finished in step S4b33 of FIG. 7B.

(p) Feeding Sequence of Body Text p6

The page printing sequence of the body text p6 is started after the elapse of t5 from the start of sequence of the inserting paper p5. The "feeding stand-by" in the feeding sequence of the body text p6 also includes the waiting time Tdiff for delaying the feeding sequence in the body text feeding determination similarly to the body text p4. The progress of the body text feeding sequence after determination of "feeding is possible" is made in the body text feeding determination is similar to that of the body texts p2 and p4.

As described above, even if the remaining amount of inserting paper in the tray selected as the feeding source of inserting paper in the inserter 3 is small, in the case where there is another tray that can be used instead, the body text feeding sequence is performed by the pre-presence/absence-detection operation. If the post-presence/absence-detection operation is performed on the body text p4, the start timing of the body text feeding sequence of the body text p4 is delayed to a time when the presence/absence of the inserting paper p3 serving as the last preceding page is confirmed as illustrated in FIG. 11. In contrast, according to the present exemplary embodiment, the body text p4 can be fed at an earlier timing, and thus the productivity of the image forming system can be improved.

In addition, focusing on a discharge interval t3' between the inserting paper p3 and the body text p4, it can be seen that the discharge interval t3' is longer than the start interval t3 of page printing sequence between the inserting paper p3 and the body text p4. This is because the start of the body text feeding sequence of the body text p4 is delayed in accordance with the decrease in the remaining amount of inserting paper in the first feed tray 320 so as to secure the time Tdiff required for switching the tray in the inserter 3. By using this longer interval, the feeding source of inserting paper can be switched from the first feed tray 320 to the second feed tray 321 in the period between the inserting paper p3 and the inserting paper p5 without stopping the conveyance operation of the body text p6.

Modification Example

To be noted, the conditions for transition from the pre-presence/absence-detection operation to the post-presence/absence-detection operation are not limited to those described in the body text determination of the present exemplary embodiment corresponding to steps S4c2 and S4a17 in FIG. 8. For example, step S4a17 may be omitted, and, in the case where there is another tray to which the feeding source of inserting paper can be switched from the currently selected tray, the pre-presence/absence-detection operation may be continued regardless of the remaining amount of inserting paper in the tray to which the switching is performed. For example, such transition conditions can be applied to a case where the risk of stoppage of the job due to shortage of inserting paper is small even if the pre-presence/absence-detection operation is continued after switching the tray, such as a case where the detection accuracy of the inserting paper remaining amount is high or a case of executing a job in which the frequency of insertion of inserting paper is low.

In addition, although a case were the inserter 3 includes the two supporting portions 320 and 321 has been described in the present exemplary embodiment, a configuration in which three or more supporting portions are provided and a supporting portion serving as the feeding source of inserting paper is switched may be employed. In this case, when there are a plurality of supporting portions usable in place of the currently selected supporting portion, the supporting portion is selected in accordance with a predetermined priority. For example, in the case where a third feed tray is provided in addition to the first feed tray 320 and the second feed tray 321 and the feeding source of inserting paper is switched from the third feed tray to another tray, the first feed tray 320 has a higher priority than the second feed tray 321.

Second Exemplary Embodiment

A second exemplary embodiment of the present disclosure will be described below. The image forming system of the present exemplary embodiment is different from the first exemplary embodiment in that the control of automatic switching of the feed tray in the inserter is concentrated in the printer controller 900. In the description below, elements having the same configuration and effects as in the first exemplary embodiment will be denoted by the same reference signs as in the first exemplary embodiment, and description thereof will be omitted.

Figure 12:
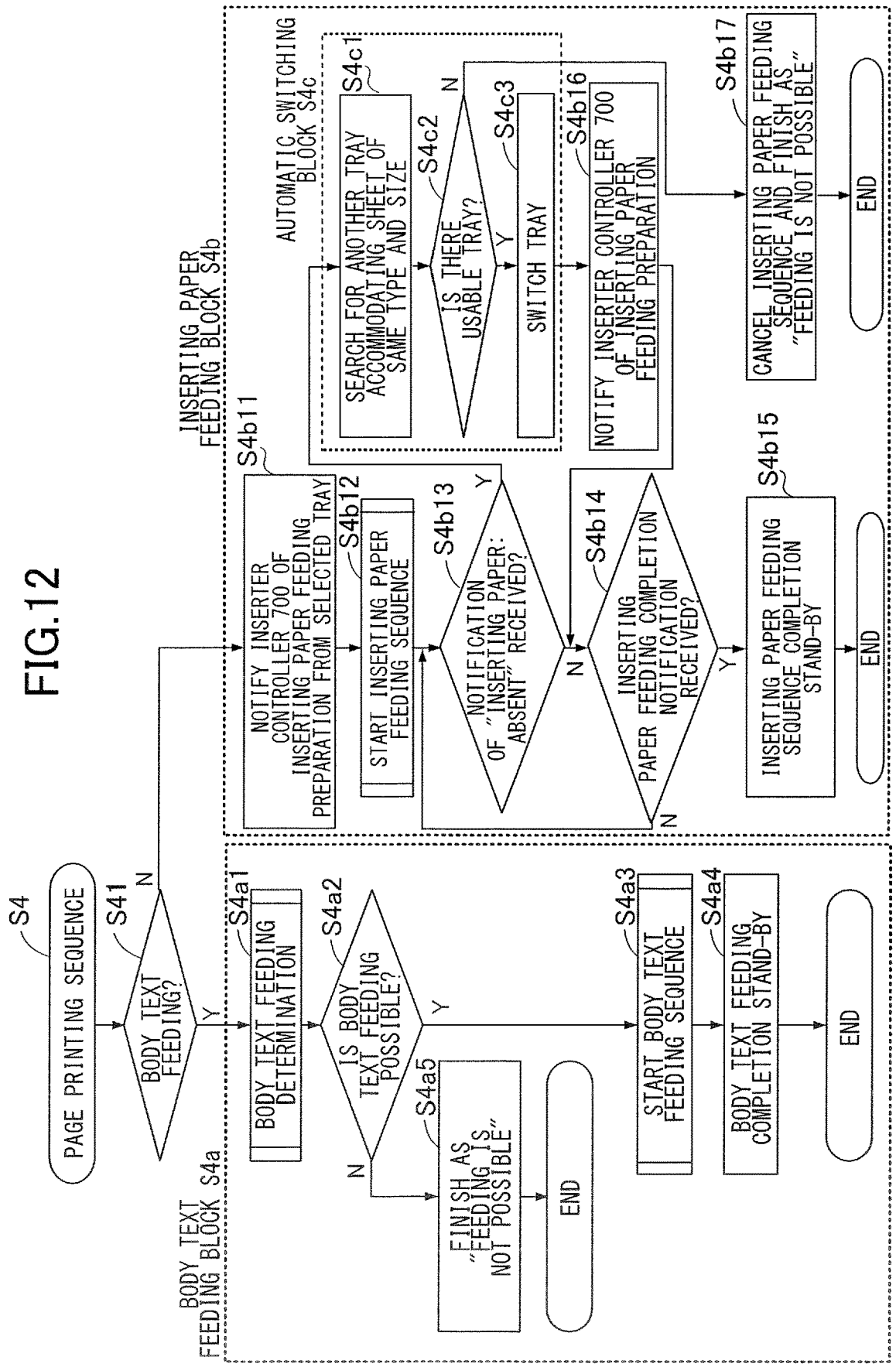
FIG. 12 is a flowchart illustrating a page printing sequence according to a second exemplary embodiment.

FIG. 12 is a flowchart illustrating the page printing sequence of the image forming apparatus of the present exemplary embodiment corresponding to step S4 of FIG. 5. Similarly to the first exemplary embodiment, the page printing sequence is executed by the printer controller 900. In the page printing sequence, first, whether the page to be printed is a body text page or inserting paper is determined in step S41, the process proceeds to the body text feeding block S4a in the case where the page to be printed is a body text page, and the process proceeds to the inserting paper feeding block S4b in the case where the page to be printed is inserting paper.

Since processing of the body text feeding block S4a is similar to that of the first exemplary embodiment, detailed description thereof will be omitted. Similarly to the first exemplary embodiment, even if the remaining amount of inserting paper in the tray selected as the feeding source of inserting paper is small, the pre-presence/absence-detection operation is continued in block S4c' of FIG. 8 in the case where there is another tray that can be used instead. In addition, in the case where the remaining amount of inserting paper in the tray selected as the feeding source of inserting paper has become small and there is a possibility that switching of the tray is to be performed, processing of delaying the start of the feeding sequence of a body text page whose last preceding page is inserting paper is performed in step S4a19 of FIG. 8. Therefore, also in the present exemplary embodiment, the productivity of the image forming system can be improved, and the possibility of stoppage of the job caused by switching of the tray can be reduced.

The inserting paper feeding block S4b of the present exemplary embodiment will be described. Here, description will be given on the premise that the page printing sequence S4 is started in a state in which the first feed tray 320 is selected as the feeding source of inserting paper in the inserter 3.

When the inserting paper feeding block S4b is started, first, the printer controller 900 designates the first feed tray 320 and transmits a notification of inserting paper feeding preparation to the inserter controller 700 in step S4b11, and starts the inserting paper feeding sequence in step S4b12. Since the processing of the inserting paper feeding sequence is similar to that of the first exemplary embodiment illustrated in FIG. 7B, description thereof will be omitted.

After the start of the inserting paper feeding sequence, while notification of "inserting paper: absent" that will be described later is not received from the inserter controller 700, that is, while the result of step S4b13 is N, the printer controller 900 waits for inserting paper feeding completion notification from the inserter controller 700 in step S4b14. When the inserting paper feeding completion notification is received, the completion of the inserting paper feeding sequence is waited for in step S4b15, and the page printing sequence is finished. After the start of the inserting paper feeding sequence, if the notification of "inserting paper: absent" is received from the inserter controller 700 before receiving the inserting paper feeding completion notification from the inserter controller 700, that is, in the case where the result of step S4b13 is Y, the process proceeds to the automatic switching block S4c. The notification of "inserting paper: absent" herein indicates that there is no inserting paper that can be fed in the tray designated in the inserting paper feeding preparation, that is, in the first feed tray 320 that is currently selected.

In the automatic switching block S4c, whether or not there is a tray usable as the feeding source of inserting paper other than the currently selected tray is checked in step S4c1. The criterion of the other tray that can be used is the same as in the first exemplary embodiment, that is, that at least one sheet of inserting paper is supported thereon and the sheet information thereof satisfies a predetermined matching condition with the sheet information of the designated feed tray. In the case where such another tray has been found, that is, in the case where the result of step S4c2 is Y, the feed tray serving as the feeding source of inserting paper is switched in step S4c3, the feeding tray to which switching has been performed is designated, and the inserting paper feeding notification is transmitted again to the inserter controller 700 in step S4b16. In the case where no tray serving as the switching destination has been found in step S4c2, the inserting paper feeding sequence is cancelled in step S4b17, and the page printing sequence is finished by making a determination of "feeding is not possible".

Control of Inserter

Figure 13A:
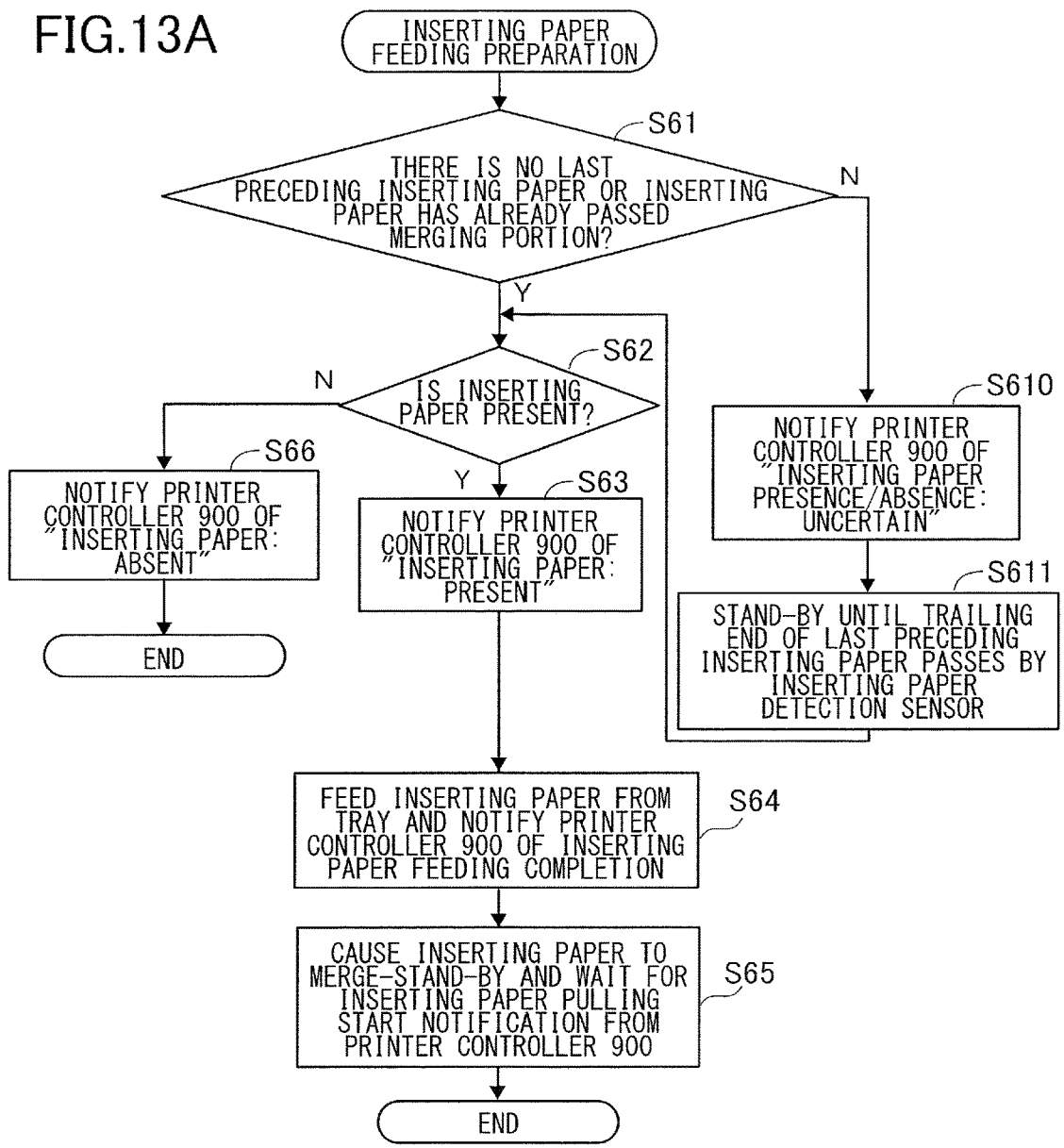
FIG. 13A is a flowchart illustrating processing performed in the case where an inserter according to the second exemplary embodiment has received notification of inserting paper feeding preparation.
Figure 13B:
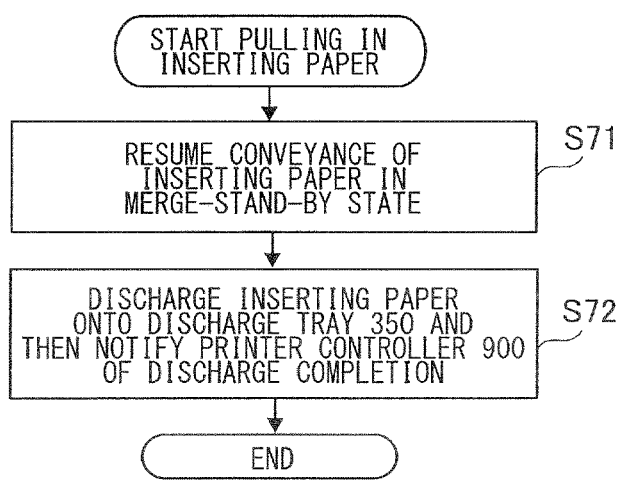
FIG. 13B is a flowchart illustrating processing performed in the case where the inserter according to the second exemplary embodiment has received notification of start of pulling of inserting paper.

FIGS. 13A and 13B are flowcharts illustrating control performed by the inserter controller 700. Processing of these flowcharts is performed by the CPU 701 reading out and executing a control program describing processing of each step.

FIG. 13A is a flowchart illustrating control performed by the inserter controller 700 when receiving the notification of inserting paper feeding preparation indicated by S4b2 or the like in FIG. 6 from the printer controller 900. When the notification of inserting paper feeding preparation is received, the inserter controller 700 performs processing for checking presence/absence of inserting paper in a feed tray designated in the notification received from the printer controller 900. This processing corresponds to steps S61, S62, S610, and S611. The processing for checking the presence/absence of inserting paper is similar to that of the first exemplary embodiment, and one of "inserting paper: present", "inserting paper: absent", and "inserting paper presence/absence: uncertain" is notified to the printer controller 900 on the basis of the state of the last preceding inserting paper and the detection result of the inserting paper detection sensor.

However, in the case where it is determined in step S62 that no inserting paper is present in the tray designated in step S62, the inserter controller 700 of the present exemplary embodiment does not search for the substitute tray, transmits "inserting paper: absent" to the printer controller 900, and finishes the processing in step S66. The printer controller 900 having received the notification of "inserting paper: absent" performs processing of switching the tray serving as the feeding source of inserting paper in accordance with the procedure of automatic switching described above in block S4c of FIG. 12.

As described above, in the present exemplary embodiment, in the case where there is no inserting paper in the feed tray originally designated by the printer controller 900, the processing of automatic switching is performed on the basis of the notification of "inserting paper: absent" from the inserter controller 700. As a result of this, in the case where there is another tray usable as the feeding source of inserting paper, the feeding of the inserting paper is continued by automatically switching the feeding source, and therefore the print job can be continued without being stopped.

To be noted, the control performed by the inserter controller 700 in the case where the notification of start of pulling of inserting paper illustrated in FIG. 13B is similar to that of the first exemplary embodiment. That is, when the notification of start of pulling of inserting paper is received, conveyance of the inserting paper in the merge-stand-by state is resumed in step S71, the inserting paper is pulled into the horizontal path 340, and then the inserting paper is discharged onto the discharge tray 350 by the discharge roller 302. Then, when it is confirmed by the discharge sensor 312 that the inserting paper has been discharged onto the discharge tray 350, a discharge completion notification is transmitted to the printer controller 900 in step S72.

Operation Example

FIG. 14 is a timing chart illustrating an example of progress of the print job in the image forming system of the present exemplary embodiment. Here, the description will be given by taking a job in which inserting paper and body text pages are alternately conveyed in the order of inserting paper/body text/inserting paper/body text/inserting paper/body text as an example. These pages are assigned with page numbers of p1 to p6.

Since the basic flow of operation is similar to the operation example of the first exemplary embodiment illustrated in FIG. 11, parts different from FIG. 11 will be described. To be noted, since the inserter controller 700 of the present exemplary embodiment does not have the function of automatically switching the feeding source of inserting paper, the inserting paper presence/absence confirmation states of (e), (h), and (l) are displayed for only the tray designated in the notification of the inserting paper feeding preparation.

(k) Feeding Sequence of Inserting Paper p5

When the page printing sequence of the inserting paper p5 is started, the inserting paper p1 is in the merge-stand-by state. Therefore, when the inserter controller 700 receives the notification of inserting paper feeding preparation of the inserting paper p5, (4) the designated tray is in a state of "inserting paper presence/absence: uncertain". (9) When the merge-stand-by of the inserting paper p3 is cancelled by the notification of the start of pulling of inserting paper and the conveyance of the inserting paper p3 is resumed, (10) "inserting paper: absent" of the designated tray is confirmed.

The printer controller 900 having received the notification of "inserting paper: absent" from the inserter controller 700, performs the automatic switching processing in block S4c of FIG. 12, and thus finds the second feed tray 321 usable in place of the first feed tray 320. Then, in a state in which the second feed tray 321 is designated, (12) the notification of inserting paper feeding preparation is transmitted to the inserter controller 700 again. The inserter controller 700 having received the notification of inserting paper feeding preparation confirms that the inserting paper p5 is present in the second feed tray 321, and (13) feeds the inserting paper p5 and causes the inserting paper p5 to merge-stand-by.

Other Embodiments

In the exemplary embodiments described above, the image forming system 1S in which the image forming apparatus 1 including the image forming portion 80 is connected to the inserter 3 has been described. However, the present technique can be also applied to an image forming apparatus 1 having the function of the inserter 3. Such an image forming apparatus serves as another example of the image forming system including a first feeding portion that feeds a recording sheet and a second feeding portion that feeds an inserting sheet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-062855, filed on Mar. 28, 2019, which is hereby incorporated by reference herein in its entirety.

What is claimed is:

1. An image forming system comprising:
a first feeding portion configured to feed a recording sheet;
an image forming portion configured to form an image on a recording sheet fed from the first feeding portion;
a sheet conveyance path through which a recording sheet on which an image has been formed by the image forming portion;
a second feeding portion comprising a plurality of supporting portions each configured to support an inserting sheet, the second feeding portion being configured to feed an inserting sheet from one of the plurality of supporting portions toward the sheet conveyance path;
a detection portion configured to detect information about presence/absence of an inserting sheet supported on the plurality of supporting portions; and
a controller configured to execute a job comprising a feeding process of causing the first feeding portion to feed a recording sheet and causing the image forming portion to form an image and a process of causing the second feeding portion to feed an inserting sheet to be inserted between a plurality of recording sheets,
wherein the controller is capable of executing a feed-before-detection mode in a case of performing the feeding process on a recording sheet subsequent to an inserting sheet in an order of passing through the sheet conveyance path,
wherein, in the feed-before-detection mode, the feeding process of a current recording sheet is started before the detection portion detects whether or not a last preceding inserting sheet is present on a supporting portion selected as a feeding source of an inserting sheet from among the plurality of supporting portions, the current recording sheet being a recording sheet to be fed this time, the last preceding inserting sheet being an inserting sheet to be inserted immediately before the current recording sheet, and
wherein the controller is configured to, in a case where a first supporting portion among the plurality of supporting portions has been selected as the feeding source of an inserting sheet for execution of the job and the detection portion has detected that an inserting sheet is present on a second supporting portion different from the first supporting portion among the plurality of supporting portions, start the feeding process of the current recording sheet in the feed-before-detection mode and cause the second supporting portion to feed the last preceding inserting sheet.

2. The image forming system according to claim 1,
wherein, in the case where the first supporting portion among the plurality of supporting portions has been selected as the feeding source of an inserting sheet for execution of the job and the detection portion has detected that an inserting sheet is present on the second supporting portion among the plurality of supporting portions, after the feeding process of the current recording sheet is started in the feed-before-detection mode, the controller causes the second feeding portion to
feed an inserting sheet from the first supporting portion if the detection portion has detected that an inserting sheet capable of being inserted immediately before the current recording sheet is present on the first supporting portion, and
feed an inserting sheet from the second feeding portion if the detection portion has detected that an inserting sheet capable of being inserted immediately before the current recording sheet is not present on the first supporting portion.

3. The image forming system according to claim 1,
wherein, in a case where the first supporting portion is selected as the feeding source of an inserting sheet for execution of the job,
the controller starts the feeding process of a recording sheet in the feed-before-detection mode regardless of whether or not an inserting sheet is supported by the second supporting portion, if inserting sheets of a first amount are supported on the first supporting portion, and
the controller starts the feeding process of a recording sheet in the feed-before-detection mode if inserting sheets of a second amount smaller than the first amount are supported on the first supporting portion and the detection portion has detected that an inserting sheet is present on the second supporting portion.

4. The image forming system according to claim 3,
wherein the controller is capable of executing a feed-after-detection mode in the case of performing the feeding process on a recording sheet subsequent to an inserting sheet in the order of passing through the sheet conveyance path,
wherein, in the feed-after-detection mode, the feeding process of the current recording sheet is started after the detection portion detects that the last preceding inserting sheet is present on the supporting portion selected as the feeding source of an inserting sheet from among the plurality of supporting portions, and
wherein the controller is configured to, in a case where the first supporting portion has been selected as the feeding source of an inserting sheet for execution of the job and the detection portion has detected that the inserting sheets of the second amount are supported on the first supporting portion and that no inserting sheet is supported on supporting portions other than the first supporting portion among the plurality of supporting portions, start the feeding process of the current recording sheet in the feed-after-detection mode.

5. The image forming system according to claim 1, further comprising an input device through which first sheet information about an inserting sheet supported on the first supporting portion and second sheet information about an inserting sheet supported on the second supporting portion are input,
wherein the controller is configured to, in a case where the first supporting portion has been selected as the feeding source of an inserting sheet for execution of the job, allow an inserting sheet to be fed from the second supporting portion if the first sheet information and the second sheet information satisfy a predetermined matching condition, and not allow an inserting sheet to be fed from the second supporting portion if the first sheet information and the second sheet information do not satisfy the predetermined matching condition.

6. The image forming system according to claim 1,
wherein the controller is changeable between a first state and a second state,
wherein, in the first state, an inserting sheet is allowed to be fed from the second supporting portion in the case where the first supporting portion has been selected as the feeding source of an inserting sheet for execution of the job and the detection portion has detected that an inserting sheet is present on the second supporting portion, and
wherein, in the second state, no inserting sheet is allowed to be fed from the second supporting portion even in the case where the first supporting portion has been selected as the feeding source of an inserting sheet for execution of the job and the detection portion has detected that an inserting sheet is present on the second supporting portion.

7. The image forming system according to claim 1,
wherein the detection portion comprises
a remaining amount obtaining portion configured to obtain a remaining amount of inserting sheet supported on the first supporting portion,
a first presence/absence detection portion configured to detect that at least one inserting sheet is present on the first supporting portion, and
a second presence/absence detection portion configured to detect that at least one inserting sheet is present on the second supporting portion.

* * * * *